United States Patent
Tamura

(10) Patent No.: US 10,419,352 B2
(45) Date of Patent: Sep. 17, 2019

(54) PACKET CONTROL APPARATUS AND PACKET CONTROL SYSTEM

(71) Applicant: FUJITSU LIMITED, Kawasaki-shi, Kanagawa (JP)

(72) Inventor: Masahisa Tamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 102 days.

(21) Appl. No.: 15/700,465

(22) Filed: Sep. 11, 2017

(65) Prior Publication Data

US 2018/0077070 A1    Mar. 15, 2018

(30) Foreign Application Priority Data

Sep. 15, 2016 (JP) .................................. 2016-180198

(51) Int. Cl.
| | |
|---|---|
| *H04L 12/28* | (2006.01) |
| *H04L 12/851* | (2013.01) |
| *G06F 3/06* | (2006.01) |
| *H04L 29/08* | (2006.01) |

(52) U.S. Cl.
CPC ........ *H04L 47/2441* (2013.01); *G06F 3/0658* (2013.01); *H04L 67/1097* (2013.01)

(58) Field of Classification Search
CPC ............. H04L 47/2441; H04L 67/1097; G06F 3/0658
See application file for complete search history.

(56) References Cited

U.S. PATENT DOCUMENTS

| | | | |
|---|---|---|---|
| 2003/0031462 A1 | 2/2003 | Katsuno et al. | |
| 2004/0095901 A1* | 5/2004 | Rajkotia | H04L 47/14 370/328 |
| 2005/0246388 A1 | 11/2005 | Yamatake | |
| 2006/0095705 A1* | 5/2006 | Wichelman | G06F 3/0605 711/171 |
| 2006/0294215 A1* | 12/2006 | Noble | H04L 67/1097 709/223 |
| 2011/0125749 A1* | 5/2011 | Wood | H04L 43/026 707/737 |
| 2011/0196971 A1* | 8/2011 | Reguraman | H04L 45/00 709/228 |
| 2013/0066883 A1 | 3/2013 | Tamura et al. | |
| 2015/0131451 A1 | 5/2015 | Iizuka et al. | |

(Continued)

FOREIGN PATENT DOCUMENTS

| | | |
|---|---|---|
| JP | 2003-23464 | 1/2003 |
| JP | 2003-91468 | 3/2003 |

(Continued)

*Primary Examiner* — Clemence S Han
(74) *Attorney, Agent, or Firm* — Xsensus LLP

(57) ABSTRACT

A non-transitory, computer-readable recording medium has stored therein a program for causing a computer to execute a process that includes: receiving packets captured from a network and allocating first groups in which the packets are classified in accordance with a first scheme to storage locations in a storage; allocating second groups in which the packets are classified in accordance with a second scheme to the storage locations in the storage; and selecting the second groups allocated to the storage as storage locations other than the storage locations to which the first groups to which the packets belong are allocated when the packets are classified in the second groups in accordance with the second scheme.

10 Claims, 45 Drawing Sheets

(56) References Cited

U.S. PATENT DOCUMENTS

| | | | |
|---|---|---|---|
| 2015/0254088 A1* | 9/2015 | Chou | G06F 9/45541 709/212 |
| 2016/0085588 A1* | 3/2016 | Rakitzis | G06F 9/48 718/104 |
| 2016/0140140 A1* | 5/2016 | Darcy | H04L 67/1097 707/827 |
| 2016/0246677 A1* | 8/2016 | Sangamkar | G06F 11/1076 |

FOREIGN PATENT DOCUMENTS

| | | |
|---|---|---|
| JP | 2006-309796 | 11/2006 |
| JP | 2008-124758 | 5/2008 |
| JP | 2013-61739 | 4/2013 |
| JP | 2015-95785 | 5/2015 |

\* cited by examiner

FIG. 8

| PACKET ID | SESSION ID | ACQUISITION DATE |
|---|---|---|
| PC-001 | SS-01 | T-001 |
| PC-002 | SS-02 | T-002 |
| PC-003 | SS-03 | T-003 |
| PC-004 | SS-04 | T-004 |
| PC-005 | SS-03 | T-005 |
| PC-006 | SS-01 | T-006 |
| ⋮ | ⋮ | ⋮ |

FIG. 9

| SESSION ID | TRANSMISSION SOURCE IP ADDRESS | TRANSMISSION SOURCE PORT NUMBER | TRANSMISSION DESTINATION IP ADDRESS | TRANSMISSION DESTINATION PORT NUMBER | PROTOCOL NUMBER |
|---|---|---|---|---|---|
| SS-01 | 10.20.30.40 | 2000 | 10.20.30.50 | 20 | 6 |
| SS-02 | 20.30.40.50 | 3000 | 10.20.30.60 | 80 | 6 |
| SS-03 | 30.40.50.60 | 4000 | 40.50.60.70 | 3000 | 17 |
| ... | ... | ... | ... | ... | ... |

| PERIOD ID | START DATE | END DATE |
|---|---|---|
| P-01 | Q-01 | Q-02 |
| P-02 | Q-02 | Q-03 |
| P-03 | Q-03 | Q-04 |
| ⋮ | ⋮ | ⋮ |

| SESSION ID | TRANSMISSION SOURCE IP ADDRESS | TRANSMISSION SOURCE PORT NUMBER | TRANSMISSION DESTINATION IP ADDRESS | TRANSMISSION DESTINATION PORT NUMBER | PROTOCOL NUMBER |
|---|---|---|---|---|---|
| SS-01 | 10.20.30.40 | 2000 | 10.20.30.50 | 20 | 6 |
| PACKET ID | | OFFSET | | ACQUISITION DATE | |
| PC-001 | | 0 | | T-001 | |
| PC-006 | | 624 | | T-006 | |
| ⋮ | | ⋮ | | ⋮ | |

| PERIOD ID | START DATE | END DATE | |
|---|---|---|---|
| P-01 | Q-01 | Q-02 | |
| PACKET ID | OFFSET | ACQUISITION DATE | SESSION ID |
| PC-003 | 0 | T-003 | SS-03 |
| PC-004 | 384 | T-004 | SS-04 |
| ⋮ | ⋮ | ⋮ | ⋮ |

FIG. 23

| PERIOD ID | START DATE | END DATE | |
|---|---|---|---|
| P-01 | Q-01 | Q-02 | |
| PACKET ID | OFFSET | ACQUISITION DATE | SESSION ID |
| PC-001 | 0 | T-001 | SS-01 |
| PC-002 | 624 | T-002 | SS-02 |
| ⋮ | ⋮ | ⋮ | ⋮ |

FIG. 24

| | STORAGE SERVER ID |
|---|---|
| X AGGREGATION | SV-A, SV-B |
| Y AGGREGATION | SV-C, SV-D |

FIG. 28

| RANGE OF HASH VALUE OF SESSION ID | STORAGE SERVER ID |
|---|---|
| 0x0000 TO 0x3fff | SV-A |
| 0x4000 TO 0x7fff | SV-B |
| 0x8000 TO 0xbfff | SV-C |
| 0xc000 TO 0xffff | SV-D |

FIG. 33

| RANGE OF HASH VALUE OF PERIOD ID | STORAGE SERVER ID OF X AGGREGATION | STORAGE SERVER ID OF Y AGGREGATION |
|---|---|---|
| 0x0000 TO 0x3fff | SV-A | SV-C |
| 0x4000 TO 0x7fff | SV-B | SV-D |
| 0x8000 TO 0xbfff | SV-A | SV-C |
| 0xc000 TO 0xffff | SV-B | SV-D |

PACKET CONTROL APPARATUS AND PACKET CONTROL SYSTEM

CROSS-REFERENCE TO RELATED APPLICATION

This application is based upon and claims the benefit of priority of the prior Japanese Patent Application No. 2016-180198, filed on Sep. 15, 2016, the entire contents of which are incorporated herein by reference.

FIELD

The embodiments discussed herein are related to a technology for storing packets captured from a network.

BACKGROUND

There are systems that capture packets transmitted in networks, group packets in certain units, and store the packets. In such systems, data is allowed to be redundant in case that stored data is lost.

For example, as a first classification scheme of grouping packets transmitted with a common session, a scheme of maintaining two groups of packets related to the same session is considered. Apart from this scheme, as a second classification scheme of grouping packets transmitted within a period, a scheme of maintaining two groups of packets related to the same period is considered.

However, even when a group of packets are duplicated in this way, a disadvantage that a load on a process of extracting packets related to a certain period in the first classification scheme is large is not resolved. Similarly, a disadvantage that a load on a process of extracting packets related to a certain session in the second classification scheme is large is not resolved. This is because the classification scheme remains simple.

Japanese Laid-open Patent Publication Nos. 2008-124758, 2003-23464, 2003-91468, 2006-309796, 2015-95785, and 2013-061739 are examples of the related art.

SUMMARY

According to an aspect of the embodiments, a non-transitory, computer-readable recording medium has stored therein a program for causing a computer to execute a process that includes: receiving a plurality of packets captured from a network and allocating a plurality of first groups in which the plurality of packets are classified in accordance with a first scheme to a plurality of storage locations in a storage; allocating a plurality of second groups in which the plurality of packets are classified in accordance with a second scheme to the plurality of storage locations in the storage; and selecting the second groups allocated to the storage as storage locations other than the storage locations to which the first groups to which the packets belong are allocated when the plurality of packets are classified in the plurality of second groups in accordance with the second scheme.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of an index table;

FIG. 9 is a diagram illustrating an example of a session table;

FIG. 23 is a diagram illustrating an example of meta-data in the period object;

FIG. 24 is a diagram illustrating an example of an aggregation table;

FIG. 28 is a diagram illustrating an example of a first disposition table;

FIG. 33 is a diagram illustrating an example of a second disposition table;

DESCRIPTION OF EMBODIMENTS

First Embodiment

Figure 1:
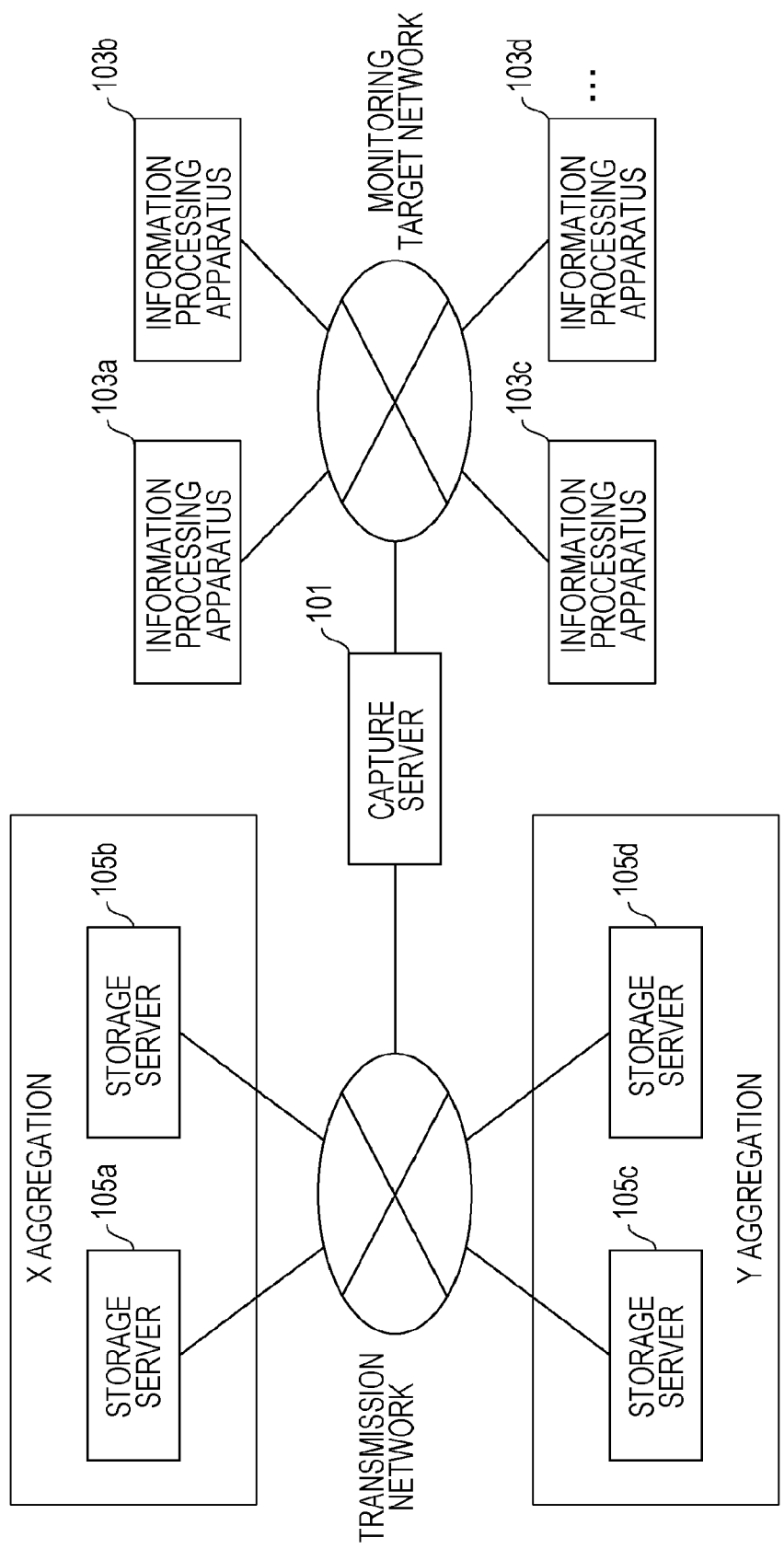
FIG. 1 is a diagram illustrating a configuration example of a network.

FIG. 1 illustrates a network configuration example. A capture server 101 captures packets transmitted in a monitoring target network. The captured packets are transmitted in sessions between information processing apparatuses 103 coupled to the monitoring target network.

The capture server 101 collects the captured packets to generate an object. That is, the object in this example is a group of the packets. Then, the capture server 101 distributes the object to storage servers 105 coupled to a transmission network to accumulate the object. The storage server is referred to as a storage in some cases.

In the embodiment, two kinds of objects are generated. The capture server 101 generates a session object in which packets transmitted with the same session are collected and generates a period object in which packets transmitted within a period are collected unconditionally.

In the embodiment, the storage server 105 can be divided into two aggregations. As illustrated, an X aggregation includes storage servers 105a and 105b. A Y aggregation includes storage servers 105c and 105d.

The transmission network and the monitoring target network are, for example, local area networks (LANs). However, networks other than the LANs may be used. In this example, the transmission network is a different network from the monitoring target network. However, the transmission network may be the same network as the monitoring target network.

Figure 2:
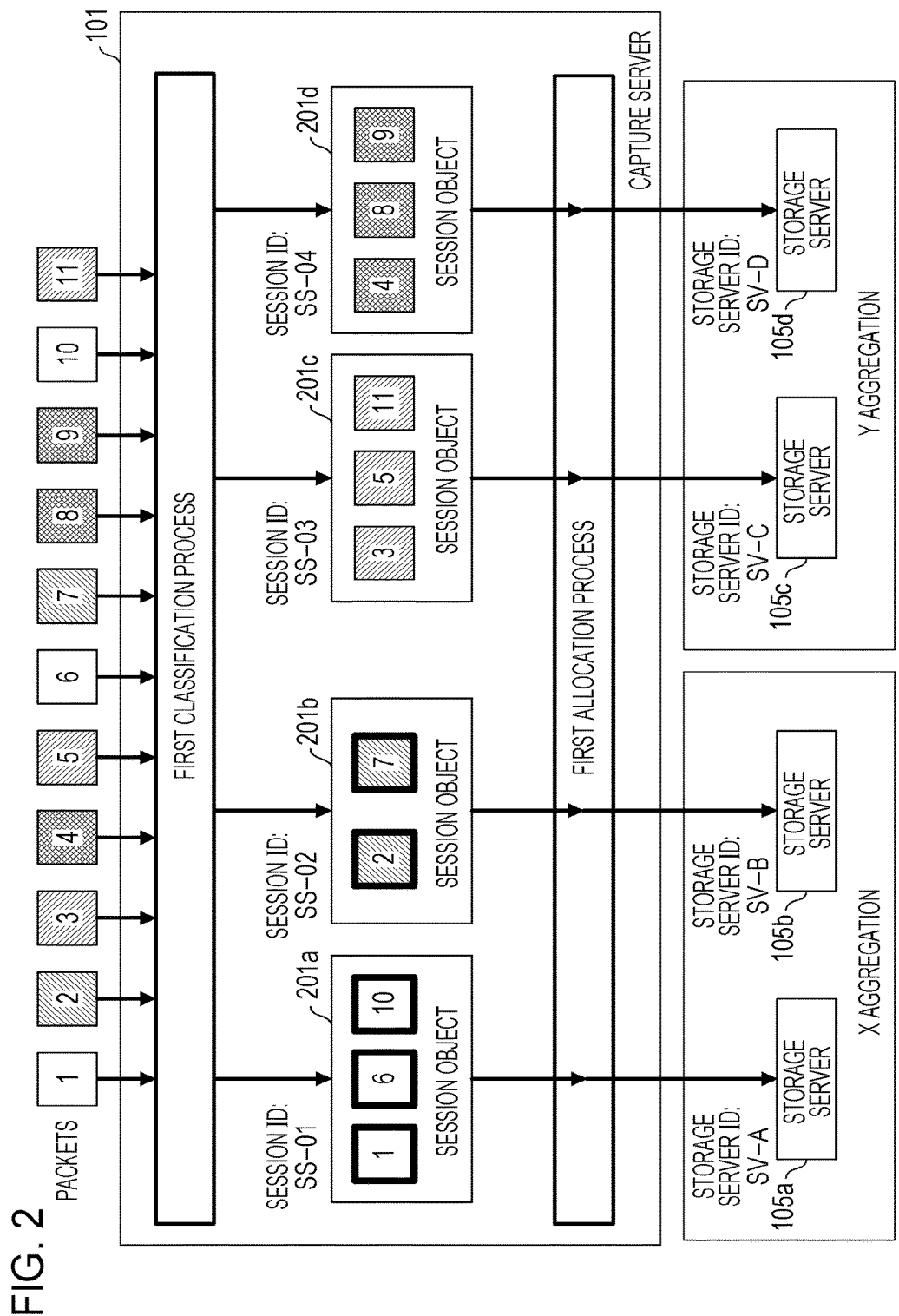
FIG. 2 is a diagram illustrating an overview of an operation of accumulating session objects.

FIG. 2 illustrates an overview of an operation of accumulating session objects 201. Here, 11 packets are assumed to be captured. In FIG. 2, numbers are given to the packets in the acquired sequence. The same pattern is given to the packets transmitted with the same session.

The capture server 101 generates a session object 201 in which the packets are collected for each session in a first classification process. In this example, 4 session objects 201a to 201d are generated. In the session object 201a, first, sixth, and tenth packets transmission with a session identified with a session ID "SS-01" are collected. In the session object 201b, second and seventh packets transmission with a session identified with a session ID "SS-02" are collected. In the session object 201c, third, fifth, and eleventh packets transmission with a session identified with a session ID "SS-03" are collected. In the session object 201d, fourth, eighth, and ninth packets transmission with a session identified with a session ID "SS-04" are collected.

The capture server 101 allocates the session objects 201a to 201d to the respective storage servers 105 in a first allocation process. The storage server 105 which is an allocation destination is uniquely decided based on a session ID.

In this example, the session object 201a is allocated to the storage server 105a identified with a storage server ID "SV-A". That is, the session object 201a is transmitted to the storage server 105a to be stored in the storage server 105a. The session object 201b is allocated to the storage server 105b identified with a storage server ID "SV-B". That is, the session object 201b is transmitted to the storage server 105b to be stored in the storage server 105b. The session object 201c is allocated to the storage server 105c identified with a storage server ID "SV-C". That is, the session object 201c is transmitted to the storage server 105c to be stored in the storage server 105c. The session object 201d is allocated to the storage server 105d identified with a storage server ID "SV-D". That is, the session object 201d is transmitted to the storage server 105d to be stored in the storage server 105d.

Here, to facilitate the description, the packets stored in the storage server 105a or the storage server 105b belonging to the X aggregation are indicated by a thick-line frame.

Figure 3:
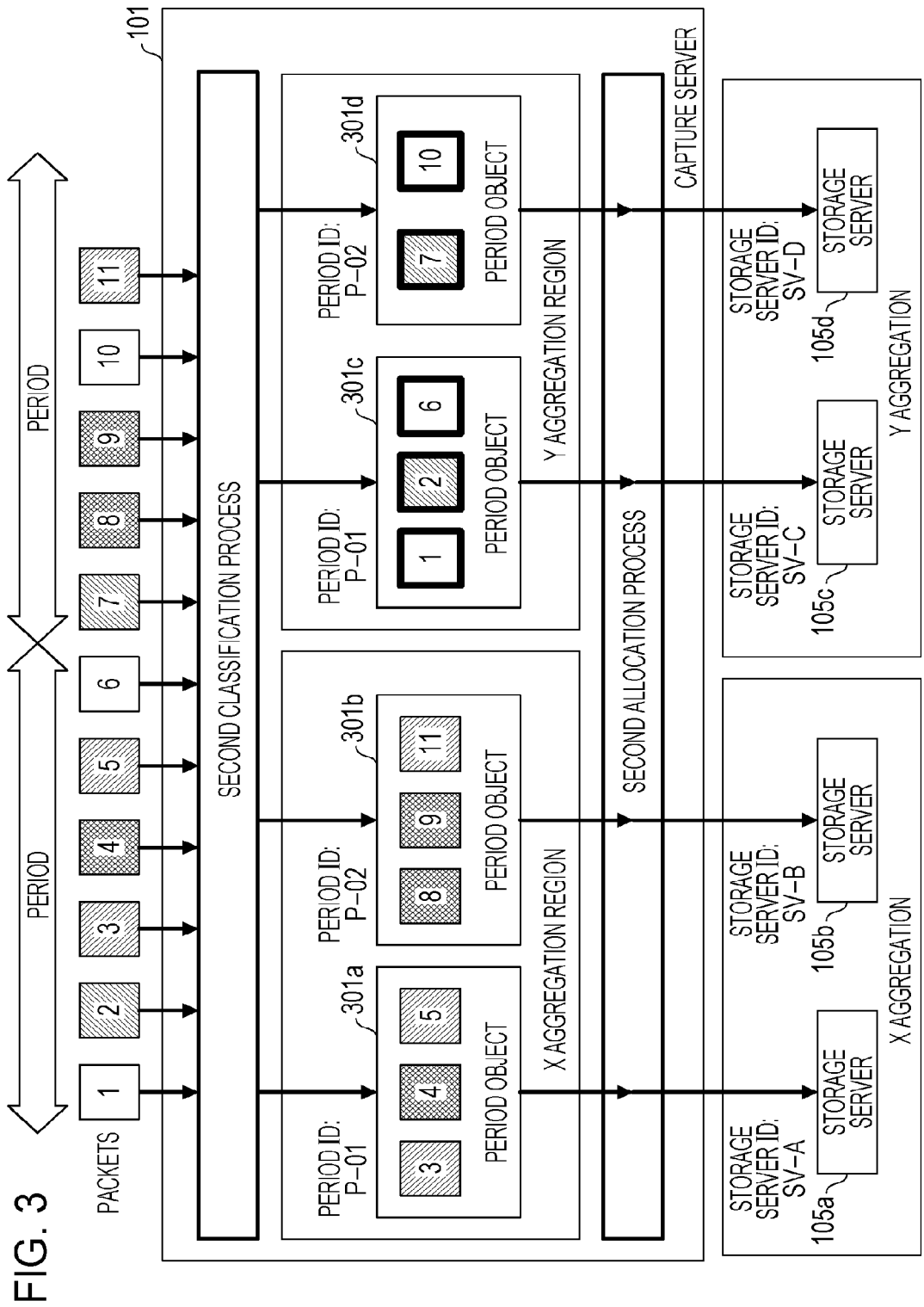
FIG. 3 is a diagram illustrating an overview of an operation of accumulating period objects.

FIG. 3 illustrates an overview of an operation of accumulating period objects 301. That is, the packets illustrated in FIG. 2 are stored in other formats. The capture server 101 divides a date on which the packets are captured according to periods. In this example, it is assumed that the first to sixth packets are captured in a first period. Similarly, it is assumed that the seventh to eleventh packets are captured in a second period. For convenience, 5 or 6 packets are captured within the same period. However, in practice, more packets are captured in some cases.

The capture server 101 divides the packets captured in one period into two groups in a second classification process. That is, in one period, two period objects 301 are generated. One period object 301 is stored in an X aggregation region assuming that the object is stored in the storage server 105 belonging to the X aggregation. The other period object 301 is stored in a Y aggregation region assuming that the object is stored in the storage server 105 belonging to the Y aggregation.

In this example, the first to sixth packets captured in the first period identified with ID "P-01" are divided into a period object 301a stored in the X aggregation region and a period object 301c stored in the Y aggregation region. Similarly, the seventh to eleventh packets captured in the second period identified with ID "P-02" are divided into a period object 301b stored in the X aggregation region and a period object 301d stored in the Y aggregation region.

The capture server 101 allocates the period objects 301a to 301d to the storage server 105 of the assumed aggregation in a second allocation process. The storage server 105 which is an allocation destination is uniquely decided based on the period ID and the assumed aggregation.

In this example, the period object 301a stored in the X aggregation region is allocated to the storage server 105a of the X aggregation. That is, the period object 301a is transmitted to the storage server 105a to be stored in the storage server 105a. The period object 301b stored in the X aggregation region is allocated to the storage server 105b of the X aggregation. That is, the period object 301b is transmitted to the storage server 105b to be stored in the storage server 105b. The period object 301c stored in the Y aggregation region is allocated to the storage server 105c of the Y aggregation. That is, the period object 301c is transmitted to the storage server 105c to be stored in the storage server 105c. The period object 301d stored in the Y aggregation region is allocated to the storage server 105d of the Y aggregation. That is, the period object 301d is transmitted to the storage server 105d to be stored in the storage server 105d.

In FIG. 2, the packets indicated by the thick-line frame, that is, the packets stored in the storage server 105 belonging to the X aggregation, are stored in the storage server 105 belonging to the Y aggregation in FIG. 3. On the other hand, in FIG. 2 the packets stored in the storage server 105 belonging to the Y aggregation are stored in the storage server 105 belonging to the X aggregation in FIG. 3. Accordingly, the same packets are distributed to the storage servers 105 belonging to the different aggregations.

To facilitate the description, the period objects 301b and 301d related to the second period are represented along with the period objects 301a and 301c related to the first period. In a process to be described below, however, the period object 301 subjected to the second allocation process is erased. Therefore, the period objects 301a and 301c related to the first period do not exist in a stage in which the period objects 301b and 301d related to the second period are provided.

Figure 4:
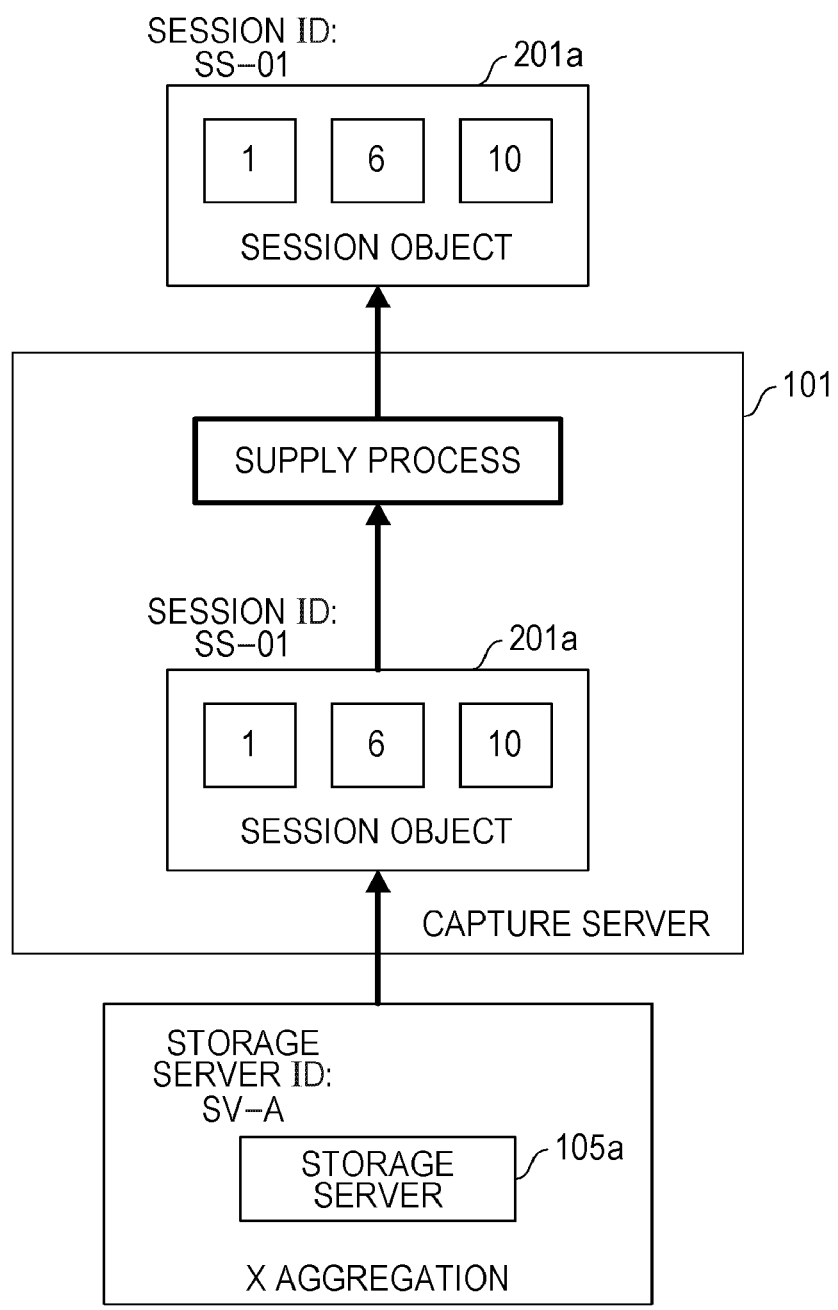
FIG. 4 is a diagram illustrating an overview of an operation of supplying the session objects.

Next, a case in which the stored session objects 201 are extracted will be described. FIG. 4 illustrates an overview of an operation of supplying the session objects 201. The capture server 101 receives an extraction condition in which a session is designated. Then, the capture server 101 acquires the session objects 201 related to the session from the storage servers 105 in the supply process and outputs the session objects 201 without change.

In this example, it is assumed that the designated session is equivalent to the session ID "SS-01". The session object 201a with the session ID "SS-01" is extracted from the storage server 105a and is output from the capture server 101.

Figure 5:
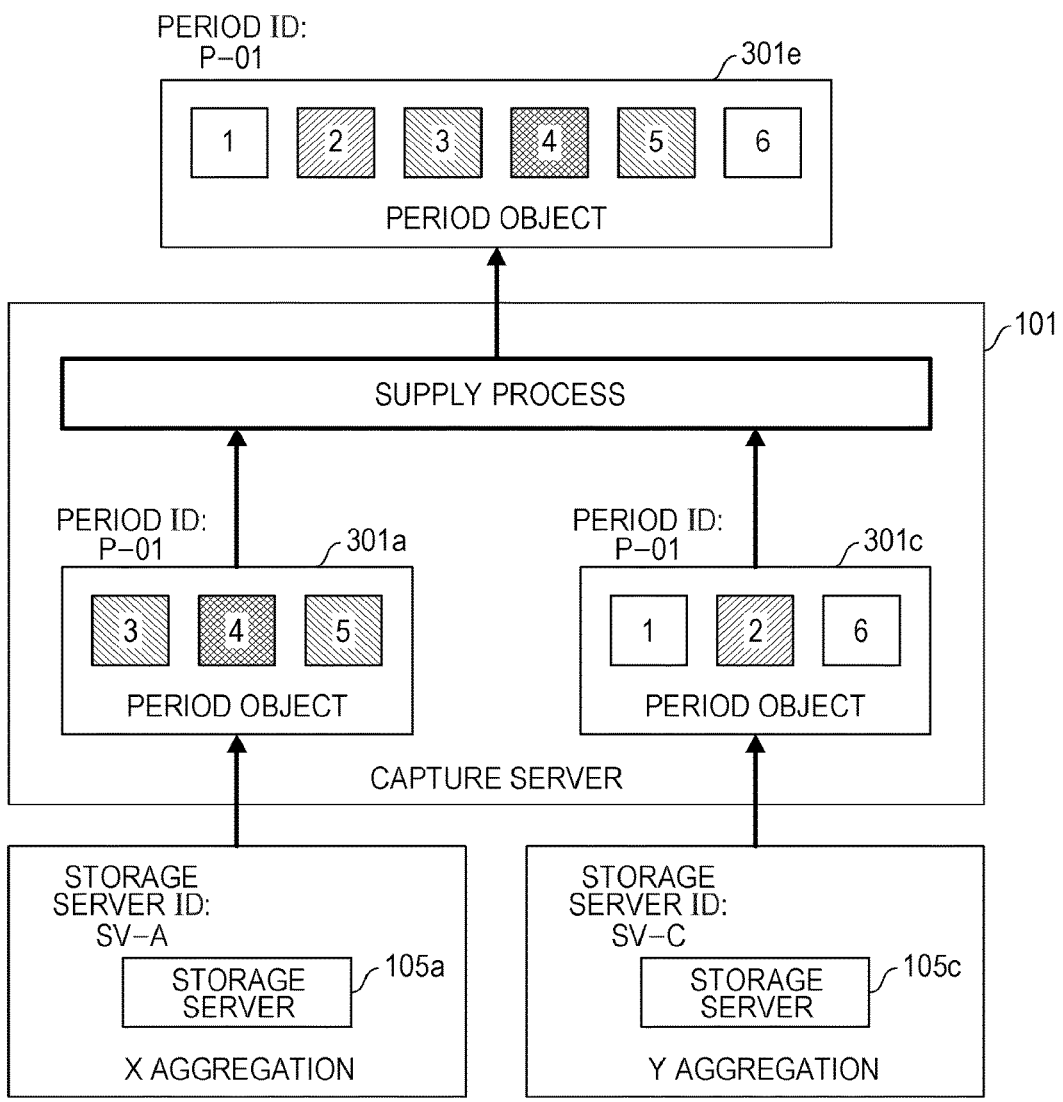
FIG. 5 is a diagram illustrating an overview of an operation of supplying the period objects.

Next, a case in which the stored period objects 301 are extracted will be described. FIG. 5 illustrates an overview of an operation of supplying the period objects 301. The capture server 101 receives an extraction condition in which a period is designated. A plurality of periods are designated. Here, the description will be made assuming that one period is designated. The capture server 101 acquires the period objects 301 related to the period from the storage server 105 belonging to the X aggregation and the storage server 105 belonging to the Y aggregation in the supply process. Then, the capture server 101 merges two acquired storage servers 105, sorts the packets in the captured sequence, and generates one period object 301, and outputs the period object 301.

In this example, it is assumed that the designated period corresponds to the period ID "P-01". As illustrated, the period object 301a with the period ID "P-01" is extracted from the storage server 105a and the period object 301c with the period ID "P-01" is extracted from the storage server 105c. Then, a period object 301e in which the period objects 301a and 301c are collected as one bundle is generated. As illustrated, the packets included in the period object 301e are arranged in the captured sequence from the first to sixth packets.

Figure 6:
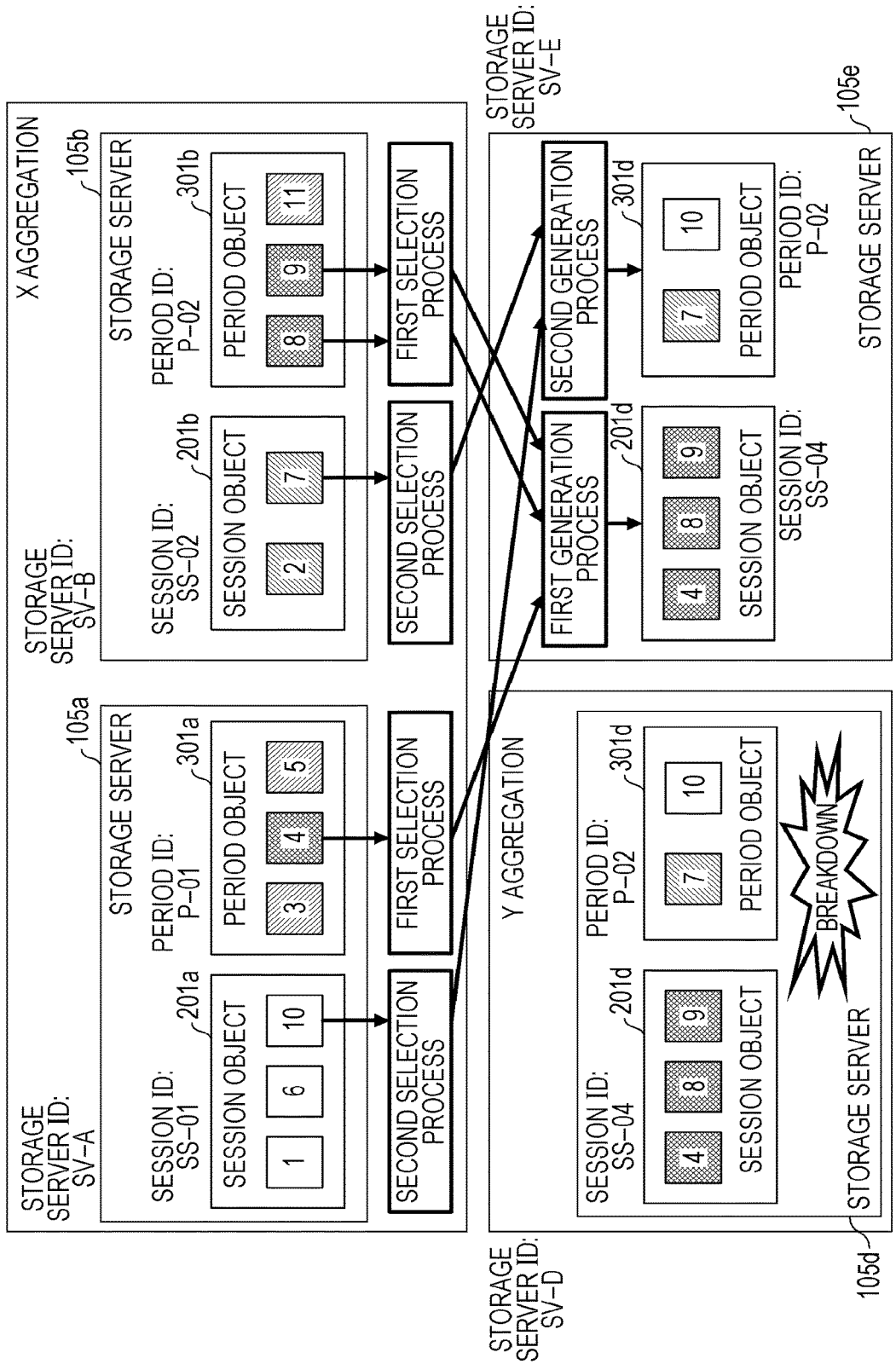
FIG. 6 is a diagram illustrating an overview of an operation of recovering the session objects and the period objects.

Next, recovery in a case in which one storage server 105d is broken down will be described. FIG. 6 illustrates an overview of an operation of recovering the session objects 201 and the period objects 301. Here, it is assumed that the storage server 105d with the storage server ID "SV-D" is broken down and the session object 201d and the period object 301d are lost. Then, the storage server 105e identified with a storage server ID "SV-E" is newly installed, and the session object 201d and the period object 301d are reproduced in the storage server 105e.

In this way, in a case in which the storage server 105d of the Y aggregation is broken down, the lost data is reproduced based on the data stored in the storage server 105 of the X aggregation. The session object 201 is recovered based on the packets included in the period object 301 and the period object 301 is recovered based on the packets included in the session object 201.

First, an operation of recovering the session object 201 will be described. The storage server 105a extracts the fourth packet included in the session object 201d from the period object 301a and transmits the period object 301a to the storage server 105e in a first selection process. The storage server 105b extracts the eighth and ninth packets included in the session object 201d from the period object 301b and transmits the eighth and ninth packets to the storage server 105e in the first selection process.

On the other hand, when the storage server 105e receives the fourth, eighth, and ninth packets, the storage server 105e generates the session object 201d in which these packets are collected in a first generation process.

Next, an operation of recovering the period object 301 will be described. The storage server 105a extracts the tenth packet included in the period object 301d from the session object 201a and transmits the tenth packet to the storage server 105e in a second selection process. The storage server 105b extracts the seventh packet included in the period object 301d from the session object 201b and transmits the tenth packet to the storage server 105e in the second selection process.

On the other hand, when the storage server 105e receives the seventh and tenth packets, the storage server 105e generates the period object 301d in which these packets are collected in a second generation process.

Here, the example in which the data is reproduced in the newly installed storage server 105 has been described. However, the data may be reproduced in the existing storage server 105. The operation in this case has been described above. The overview according to the embodiment has been described above.

Figure 7:
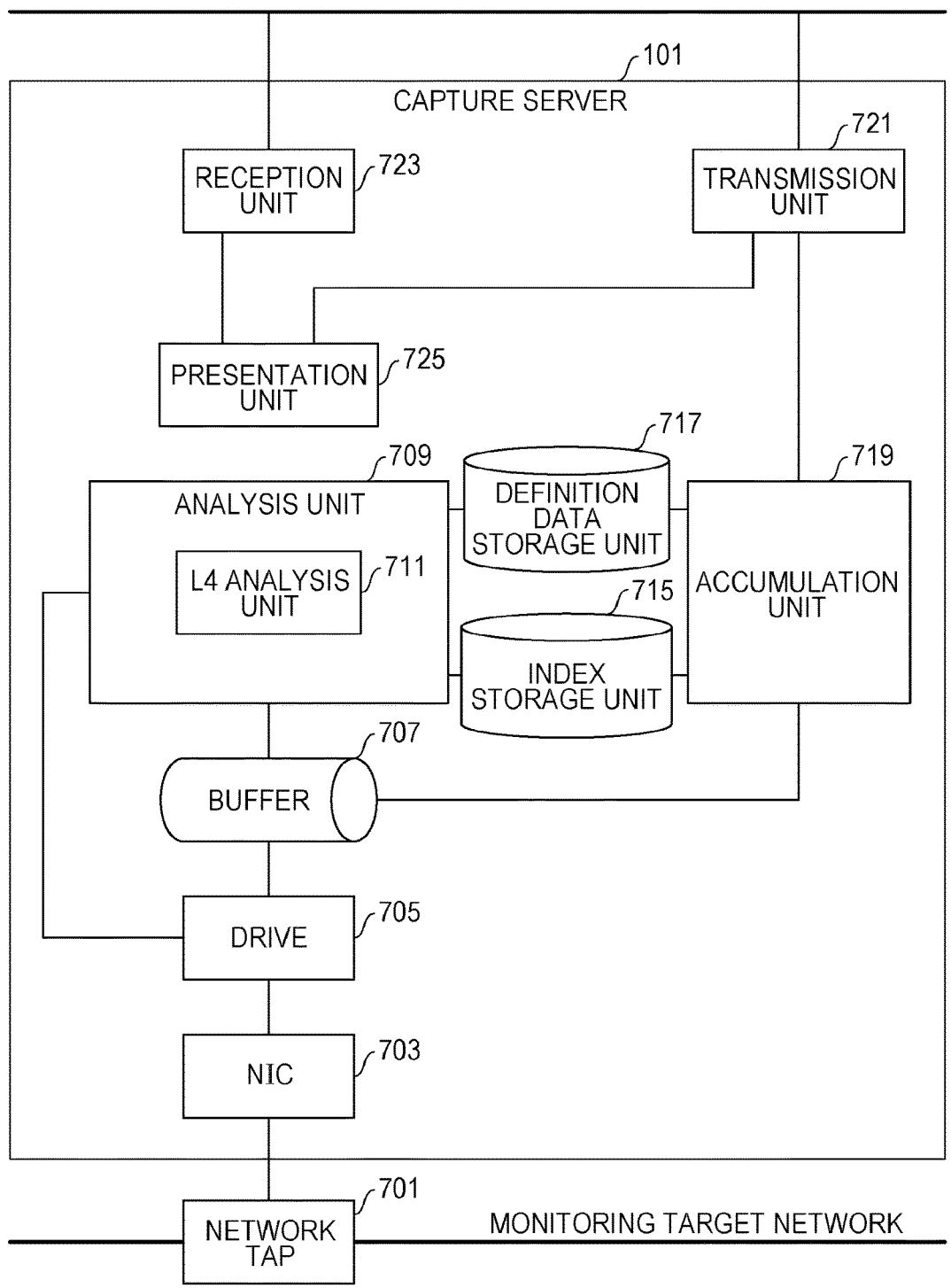
FIG. 7 is a diagram illustrating a module configuration example of a capture server.

Hereinafter, an operation of the capture server 101 will be described. FIG. 7 illustrates a module configuration example of the capture server 101. The capture server 101 includes a network interface card (NIC) 703, a driver 705, a buffer 707, an analysis unit 709, an L4 analysis unit 711, an index storage unit 715, a definition data storage unit 717, an accumulation unit 719, a transmission unit 721, a reception unit 723, and a supply unit 725.

The capture server 101 is coupled to a monitoring target network via a network tap 701. As described above, the capture server 101 captures packets flowing in the monitoring target network. In this example, the network tap 701 is used to capture packets. Here, packets passing through a switch of the monitoring target network may be duplicated to a mirror port to capture the packets. The packet is an example of a protocol data unit (PDU).

The NIC 703 is an interface card that is coupled to a network. The driver 705 extracts packets, stores the extracted packets in the buffer 707, allocates IDs to the extracted packets, and specifies acquisition times. The NIC 703 may be configured to specify the acquisition times. The buffer 707 stores the packets to which the acquisition times are added.

The analysis unit 709 mainly analyzes the packets and generates indexes for collecting the packets. The analysis unit 709 includes an L4 analysis unit 711. The L4 analysis unit 711 executes the analysis in the fourth layer (hereinafter referred to as L4) of the OSI reference model of International Organization for Standardization (ISO).

The index storage unit 715 includes two regions for storing index tables. The definition data storage unit 717 stores session defining data, specifically, a session table. The session table will be described below with reference to FIG. 9. Further, the definition data storage unit 717 stores period defining data, specifically, a period table. The period table will be described below with reference to FIG. 10.

The accumulation unit 719 generates the session object 201 and the period object 301 in which the received packets are collected and stores the generated session object 201 and period object 301 in the storage server 105. The transmission unit 721 transmits various kinds of data to the storage server 105 via a transmission network. The reception unit 723 receives various kinds of data from the storage server 105 via the transmission network. The supply unit 725 extracts and supplies the session object 201 or the period object 301.

The driver 705, the analysis unit 709, the L4 analysis unit 711, the accumulation unit 719, the transmission unit 721, the reception unit 723, and the supply unit 725 above described are realized using hardware resources (for example, see FIG. 51) and a program causing a processor to execute processes to be described below.

Figure 51:
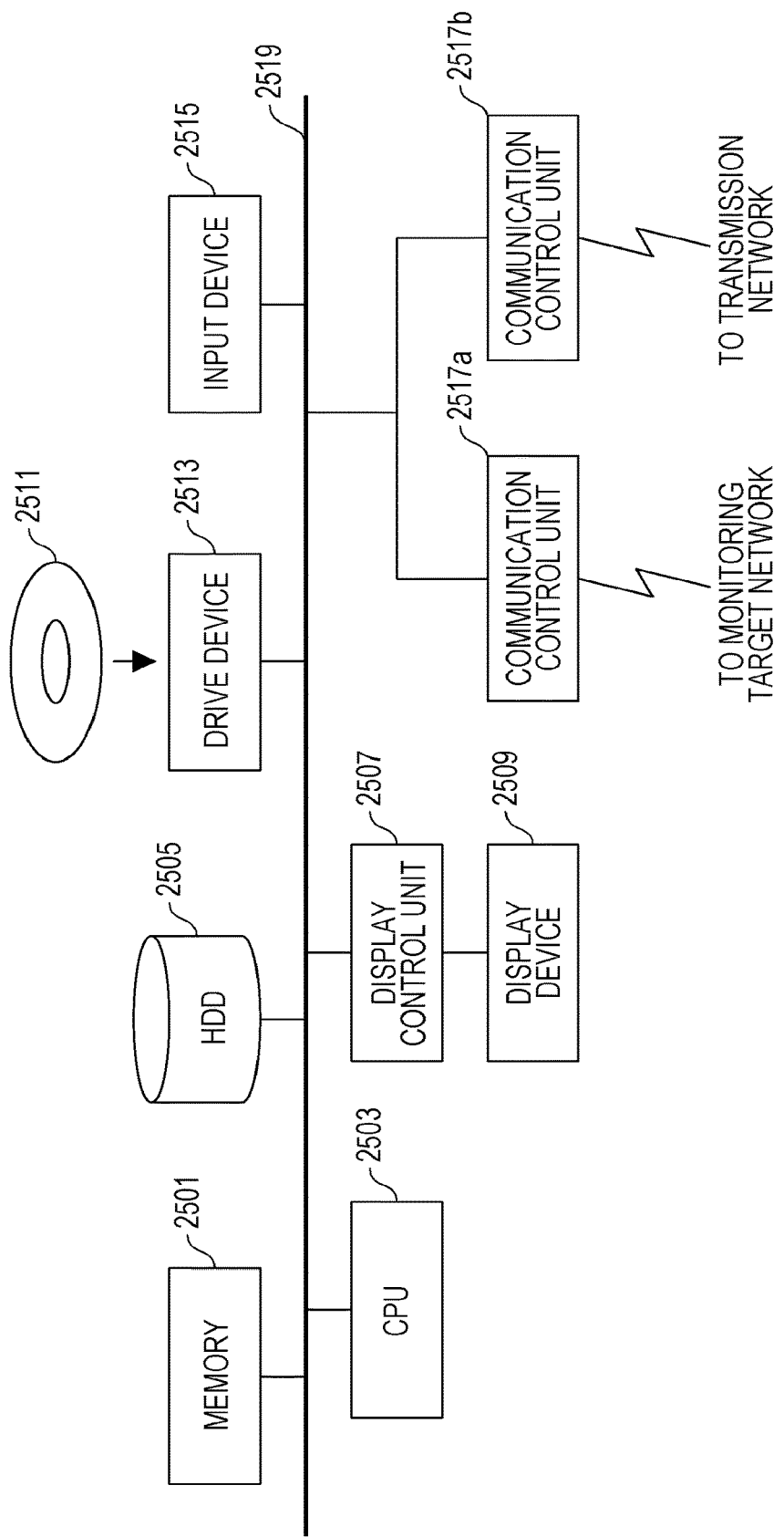
FIG. 51 is a functional block diagram illustrating a computer.

The buffer 707, the index storage unit 715, and the definition data storage unit 717 described above are realized using hardware resources (for example, see FIG. 51).

An apparatus (for example, a supply server) other than the capture server 101 may be configured to execute a supply process. In this case, this apparatus includes the transmission unit 721, the reception unit 723, and the supply unit 725.

Next, the index table stored in the index storage unit 715 will be described. FIG. 8 illustrates an example of the index table. The index table in this example has records corresponding to packets. The record of the index table has a field for storing a packet ID, a field for storing a session ID, and a field for storing an acquisition date.

The packet ID is information for identifying a packet. In this example, a sequential code is given as the packet ID to a captured packet. The session ID is information for specifying a session related to transmission of the packet. The acquisition date is a date and a time at which the packet is captured.

In the first record of this example, it is indicated that a session related to a packet to which a packet ID "PC-001" is allocated is internally identified with a session ID "SS-01". It is also indicated that the packet is captured on a date "T-001". Specifically, every parameter is actually a numerical code. However, to facilitate the description, every parameter is indicated with a text code.

Next, the session table stored in the definition data storage unit 717 will be described. FIG. 9 illustrates an example of the session table. The session table in this example has records corresponding to sessions. The record of the session table has a field for storing a session ID, a field storing a transmission source internet protocol (IP) address, a field for storing a transmission source port number, a field for storing a transmission destination IP address, a field for storing a transmission destination port number, and a field for storing a protocol number.

The session ID is an identifier which is allocated by the analysis unit 709 to specifying a session. The transmission source IP address is an IP address of the information processing apparatus 103 which is a transmission source of the packet. The transmission source port number is a port number transmitting the packet in the information processing apparatus 103 which is a transmission source of the packet. The transmission destination IP address is an IP address of the information processing apparatus 103 equivalent to a transmission destination of the packet. The transmission destination port number is a port number receiving the packet in the information processing apparatus 103 equivalent to the transmission destination of the packet. The protocol number is a number for identifying a protocol of the fourth layer of the OSI reference model of ISO. A protocol number "6" indicates Transmission Control Protocol (TCP) and a protocol number "17" indicates User Datagram Protocol (UDP).

The first record in this example indicates that a port number "2000" in the information processing apparatus 103 of an IP address "10.20.30.40" is equivalent to a transmission source and a port number "20" in the information processing apparatus 103 of IP address "10.20.30.50" is equivalent to a transmission destination in regard to the session to which the session ID "SS-01" is allocated. The first record also indicates that the protocol of the fourth layer in this session is TCP.

Figures 10, 11:
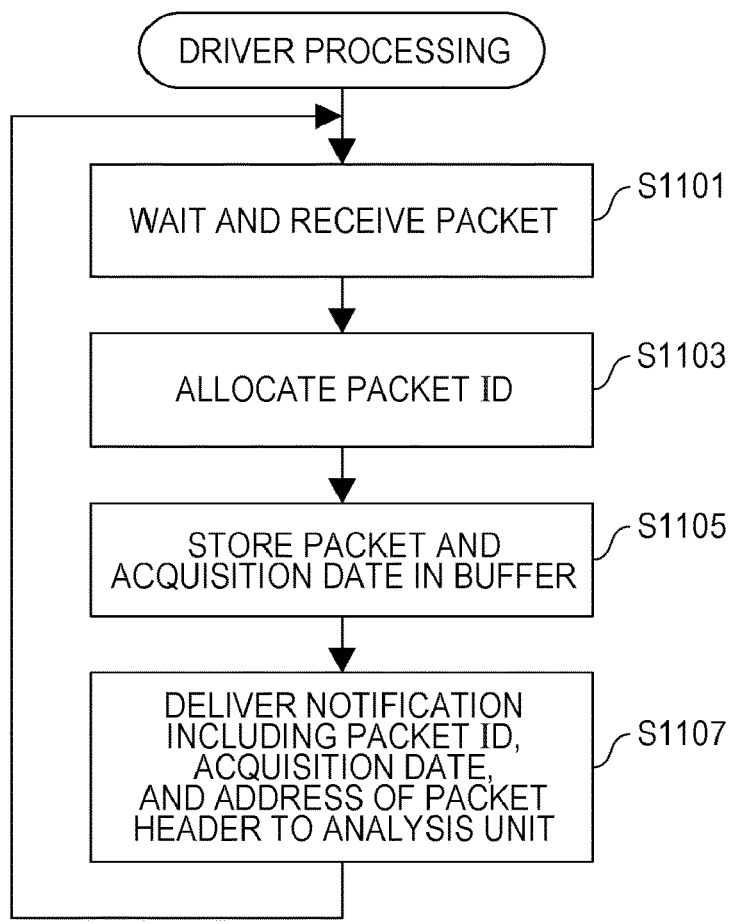
FIG. 10 is a diagram illustrating an example of a period table.
FIG. 11 is a diagram illustrating the flow of driver processing.

FIG. 10 illustrates an example of a period table. The period table in this example has a record corresponding to a period in which the period object 301 is specified. The record of the period table has a field for storing a period ID, a field for storing a start date, and a field for storing an end date.

The period ID is information for identifying a period. The start date is used to specify a start time of the period. The end date is used to specify an end time of the period.

The first record in this example indicates that a period to which a period ID "P-01" is allocated starts on a date "Q-01" and ends on a date "Q-02". For example, the period is periodically decided. The length of the period is, for example, 0.1 seconds.

FIG. 11 illustrates the flow of driver processing. The driver 705 waits and receives a packet from the NIC 703 (S1101). When the driver 705 receives the packet from the NIC 703, the driver 705 allocates a packet ID to the received packet (S1103). Then, the driver 705 stores the packet and the acquisition date in the buffer 707 (S1105). That is, the driver 705 gives a date on which the packet is captured to the stored packet. The driver 705 delivers notification including the packet ID, the acquisition date, and an address of a packet header to the analysis unit 709 (S1107). The process illustrated in FIG. 11 is an example of the driver processing.

Figure 12:
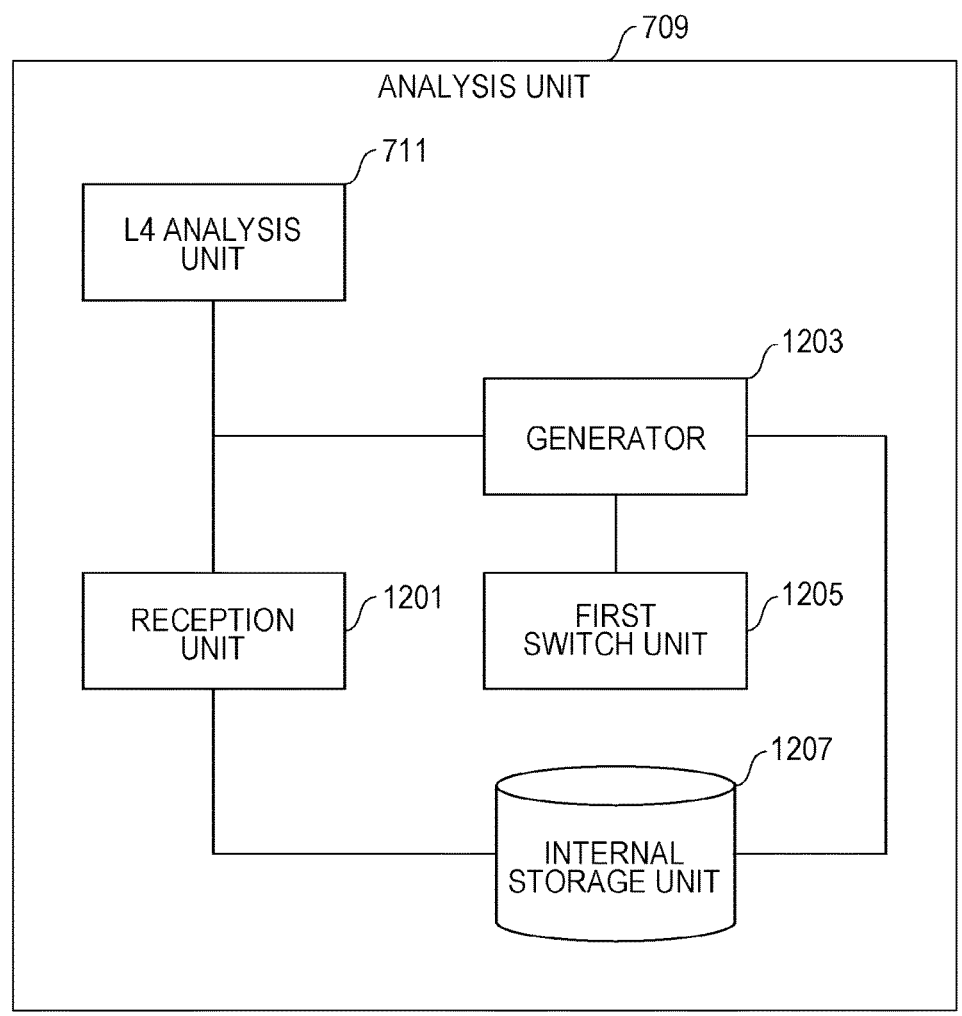
FIG. 12 is a diagram illustrating a module configuration example of an analysis unit.

FIG. 12 illustrates a module configuration example of the analysis unit 709. The analysis unit 709 includes a reception unit 1201, a generation unit 1203, a first switch unit 1205, and an internal storage unit 1207 in addition to the L4 analysis unit 711.

The reception unit 1201 receives the notification from the driver 705. The generation unit 1203 generates a session table. The first switch unit 1205 switches a region of the index table which is a destination on which the index is to be written. The internal storage unit 1207 stores data to be used inside the analysis unit 709.

The reception unit 1201, the generation unit 1203, and the first switch unit 1205 described above are realized using hardware resources (for example, see FIG. 51) and a program causing a processor to execute processes to be described below.

The above-described internal storage unit 1207 is realized using hardware resources (for example, see FIG. 51).

Figure 13:
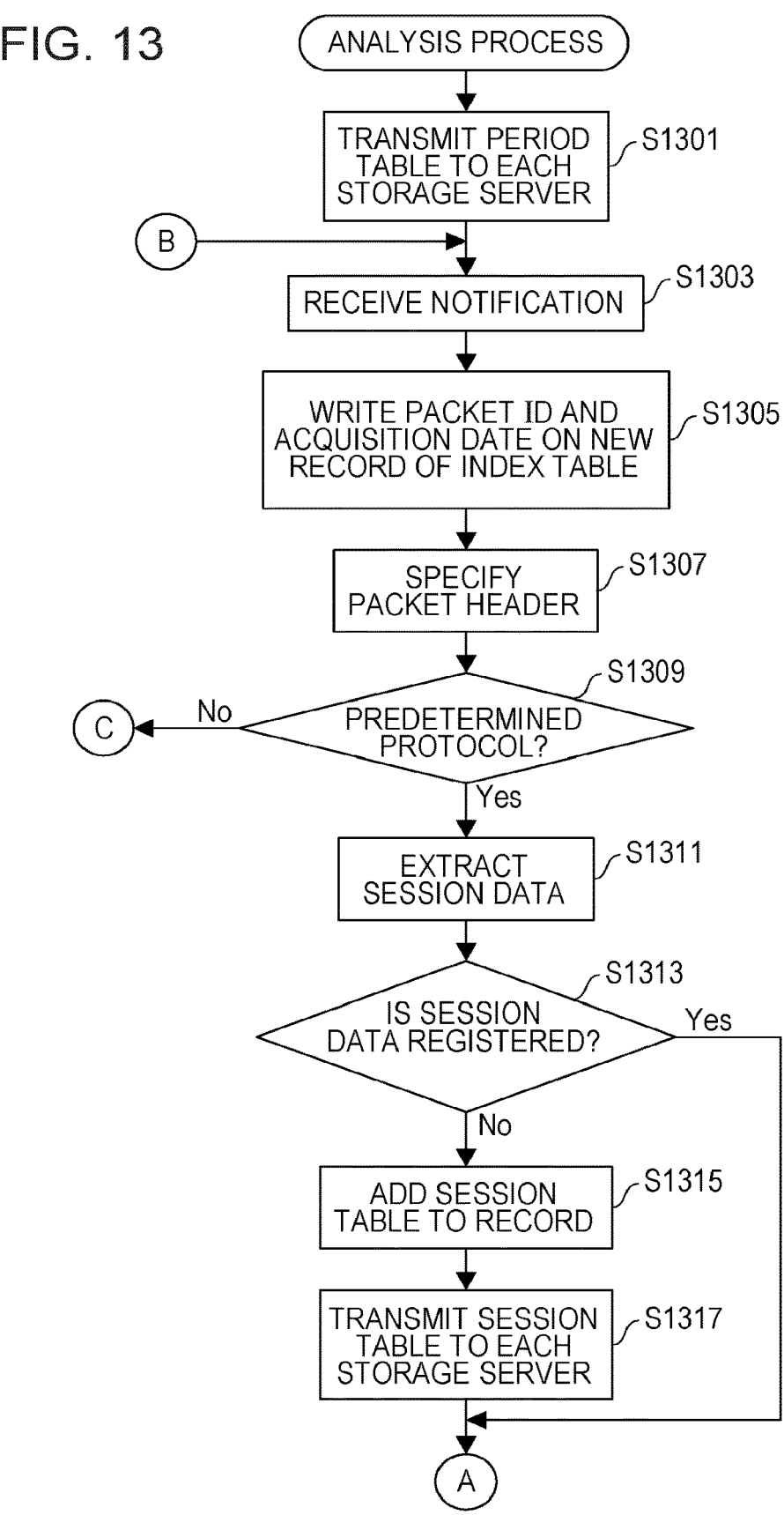
FIG. 13 is a diagram illustrating the flow of an analysis process.
Figure 14:
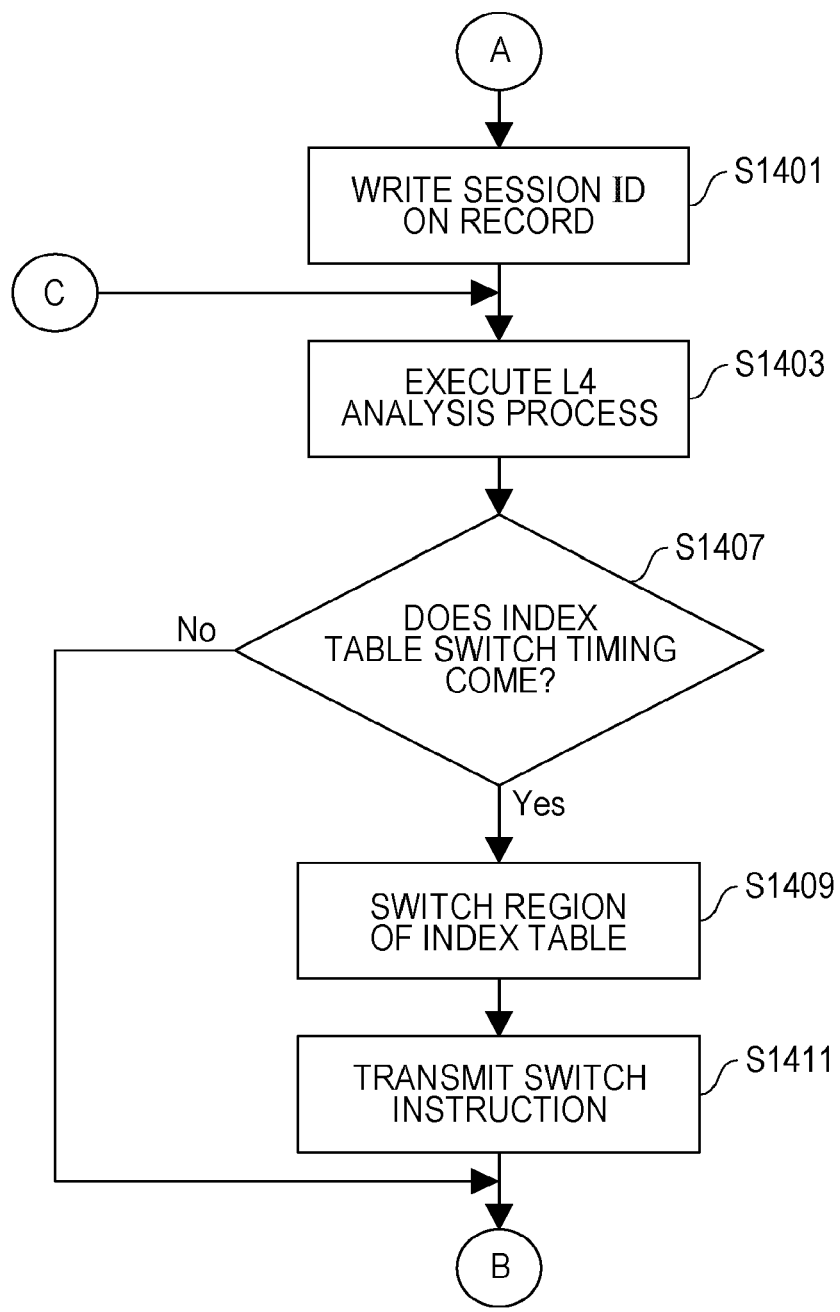
FIG. 14 is a diagram illustrating the flow of the analysis process.

FIGS. 13 and 14 illustrate the flow of an analysis process. First, the transmission unit 721 transmits the period table to each storage server 105 (S1301). Here, according to other methods, the capture server 101 and each storage server 105 may share the period table.

When the reception unit 1201 receives the notification from the driver 705 (S1303), the generation unit 1203 writes the packet ID and the acquisition date obtained from the notification on a new record of the index table (S1305). The L4 analysis unit 711 specifies a packet header according to the address included in the notification (S1307). The L4 analysis unit 711 determines whether the protocol of the packet corresponds to a predetermined protocol (S1309). The predetermined protocol is, for example, TCP or UDP. In a case in which it is determined that the protocol of the packet does not correspond to the predetermined protocol, the process moves to a process of S1403 of FIG. 14 via a terminal C. At this time, the field of the session ID in the new record remains unset.

Conversely, in a case in which it is determined that the protocol of the packet corresponds to the predetermined protocol, the L4 analysis unit 711 extracts the session data from the packet header (S1311). The session data includes a transmission source IP address, a transmission source port number, a transmission destination IP address, a transmission destination port number, and a protocol number. Such a set is also referred to as 5-tuple.

The generation unit 1203 determines whether the session data has already been registered in the session table (S1313). When it is determined that the session data has already been registered in the session table, the process moves to S1401 illustrated in FIG. 14 via a terminal A.

Conversely, when it is determined that the session data has not been registered yet in the session table, the generation unit 1203 adds a record to the session table (S1315). A new session ID and the session data are set in the new record. Specifically, the session ID, the transmission source IP address, the transmission source port number, the transmission destination IP address, the transmission destination port number, and the protocol number are set.

Then, the transmission unit 721 transmits the session table to each storage server 105 (S1317). Here, according to other methods, the capture server 101 and each storage server 105 may share the session table. When the process of S1317 illustrated in FIG. 14 ends, the process moves to a process of S1401 via a terminal A.

The description will be made with reference to FIG. 14. The generation unit 1203 writes the session ID on the same new record as the case of S1305 (S1401). The session ID is specified based on the session table.

Subsequently, the L4 analysis unit 711 executes an L4 analysis process (S1403). The L4 analysis process is the same as the process of the related art and further description thereof will not be made.

The first switch unit 1205 determines whether a switch timing of the index table comes (S1407). For example, in a case in which the number of records stored in the index table reaches a predetermined standard number, the first switch unit 1205 determines that the switch timing of the index table comes. Alternatively, in a case in which a predetermined period elapses from a previous switch time, the first switch unit 1205 may determine that the switch timing of the index table comes.

In a case in which the first switch unit 1205 determines that the switch timing of the index table comes, the first switch unit 1205 switches a region of the index table on which the index is written (S1409). The first switch unit 1205 transmits a switch instruction to the accumulation unit 719 (S1411). This is because the region of the index table from which the indexes are simultaneously read is switched even in the accumulation unit 719.

When the process illustrated in FIG. 14 ends, the process returns to the process of S1303 illustrated in FIG. 13 via a terminal B and the above-described process is repeated.

Figure 15:
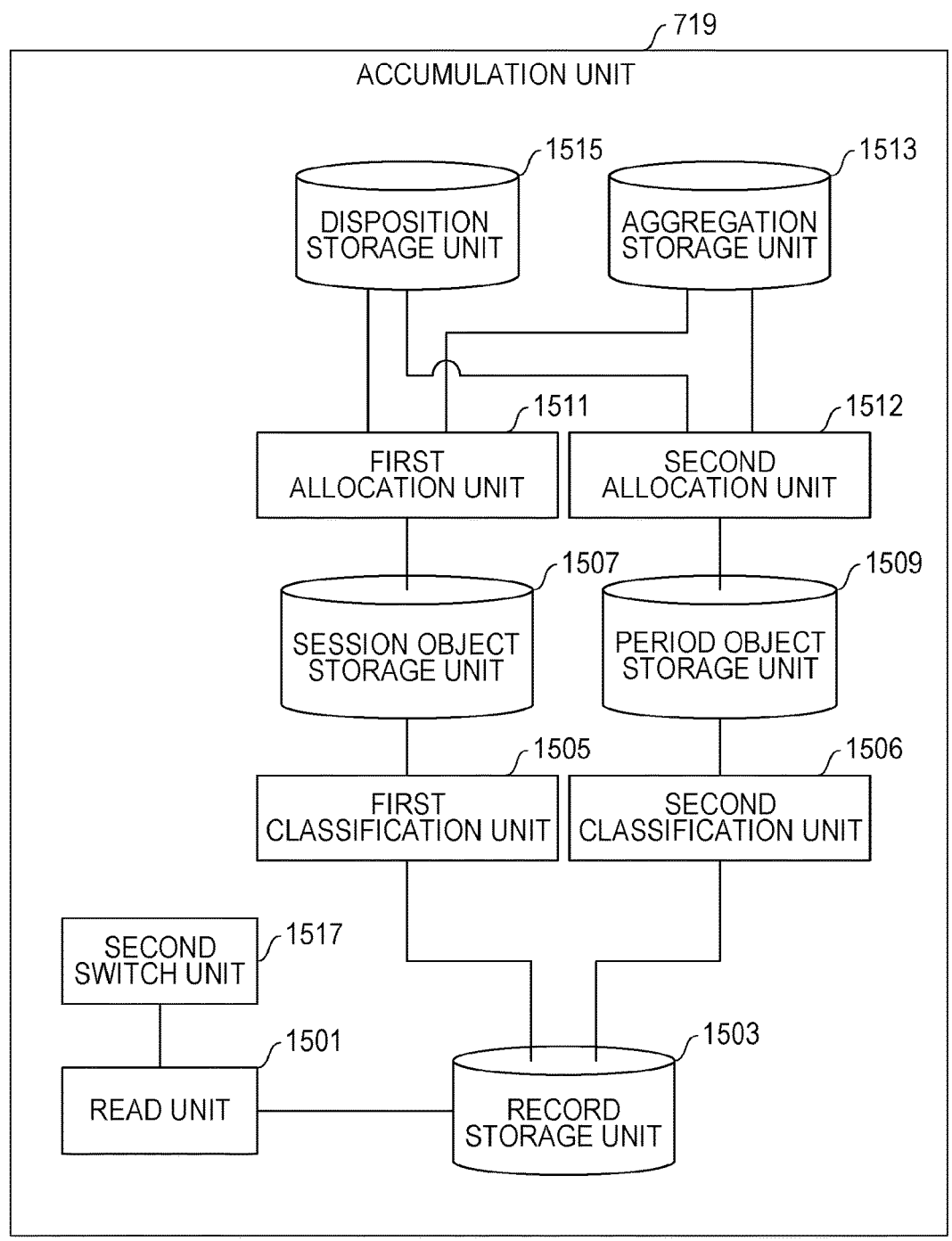
FIG. 15 is a diagram illustrating a module configuration example of an accumulation unit.

FIG. 15 illustrates a module configuration example of the accumulation unit 719. The accumulation unit 719 includes a read unit 1501, a record storage unit 1503, a first classification unit 1505, a second classification unit 1506, a session object storage unit 1507, a period object storage unit 1509, a first allocation unit 1511, a second allocation unit 1512, an aggregation storage unit 1513, a disposition storage unit 1515, and a second switch unit 1517.

The read unit 1501 reads a record of the index table from the index storage unit 715. The record storage unit 1503 temporarily stores the read record of the index table. The first classification unit 1505 executes the first classification process. The second classification unit 1506 executes the second classification process.

The session object storage unit 1507 stores the generated session object 201. The period object storage unit 1509 stores the generated period object 301.

The first allocation unit 1511 executes the first allocation process. The second allocation unit 1512 executes the second allocation process.

The aggregation storage unit 1513 stores an aggregation table. The aggregation table will be described below with reference to FIG. 24. The disposition storage unit 1515 stores a first disposition table and a second disposition table. The first disposition table will be described below with reference to FIG. 28. The second disposition table will be described below with reference to FIG. 33.

The second switch unit 1517 switches a region of the index table which is a reading source.

The read unit 1501, the first classification unit 1505, the second classification unit 1506, the first allocation unit 1511, the second allocation unit 1512, and the second switch unit 1517 described above are realized using hardware resources (for example, see FIG. 51) and a program causing a processor to execute processes to be described below.

The record storage unit 1503, the session object storage unit 1507, the period object storage unit 1509, the aggregation storage unit 1513, and the disposition storage unit 1515 described above are realized using hardware resources (for example, see FIG. 51).

Figures 16, 17:
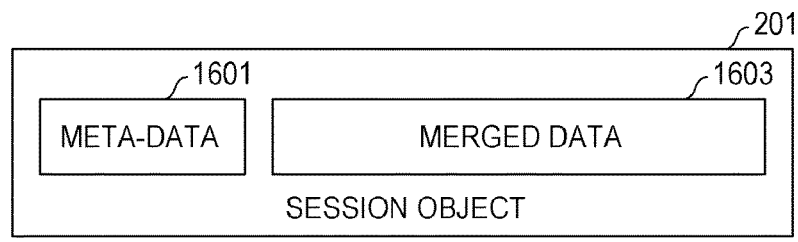
FIG. 16 is a diagram illustrating an example of the session object.
FIG. 17 is a diagram illustrating an example of meta-data in the session object.

FIG. 16 illustrates an example of the session object 201. The session object 201 in this example includes meta-data 1601 and merged data 1603. The merged data 1603 is data in which the packets are coupled. The meta-data 1601 includes data regarding a session and data regarding a packet.

FIG. 17 illustrates an example of the meta-data 1601 in the session object 201. The meta-data 1601 has a header portion and a table portion. In the header portion, a field for storing a session ID and a field for storing session data are provided. The field for storing the session data includes a field for storing a transmission source IP address, a field for storing a transmission source port number, a field for storing a transmission destination IP address, a field for storing a transmission destination port number, and a field for storing a protocol number.

The header portion in this example indicates that the meta-data 1601 corresponds to the merged data 1603 of the packets related to the session with the session ID "SS-01". The header portion in this example indicates that in this session, a port number "2000" in the information processing apparatus 103 of the IP address "10.20.30.40" is equivalent to a transmission source and a port number "20" in the information processing apparatus 103 of the IP address "10.20.30.50" is equivalent to a transmission destination. The header portion in this example indicates that a protocol of the fourth layer in this session is TCP.

In the table portion, a record is provided for each packet included in the merged data 1603. In the record, a field for storing a packet ID, a field for storing an offset, and a field for storing an acquisition date are provided. The table portion in this example indicates that a first packet is specified with the packet ID "PC-001" and an offset "0" is stored in the head. The first packet is captured on the date "T-001". A second packet is specified with a packet ID "PC-006" and an offset "624" is stored in the head. The second packet is captured on the date "T-006".

Figure 18:
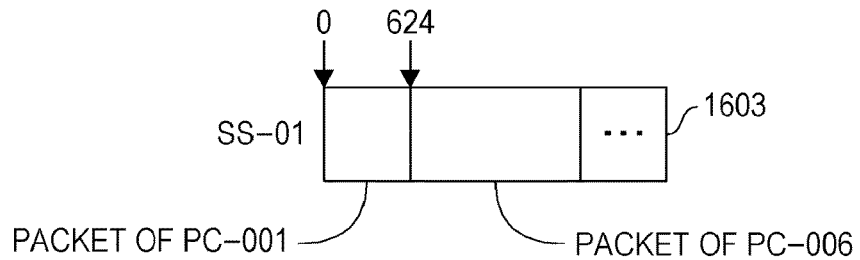
FIG. 18 is a diagram illustrating an example of merged data in the session object.

FIG. 18 illustrates an example of the merged data 1603 in the session object 201. In the merged data 1603, the packets transmitted with the same session are coupled. In FIG. 18, it is indicated that a head offset in the packet with the packet ID "PC-001" is "0" and a head offset in the packet with the packet ID "PC-006" is "624".

Figure 19:
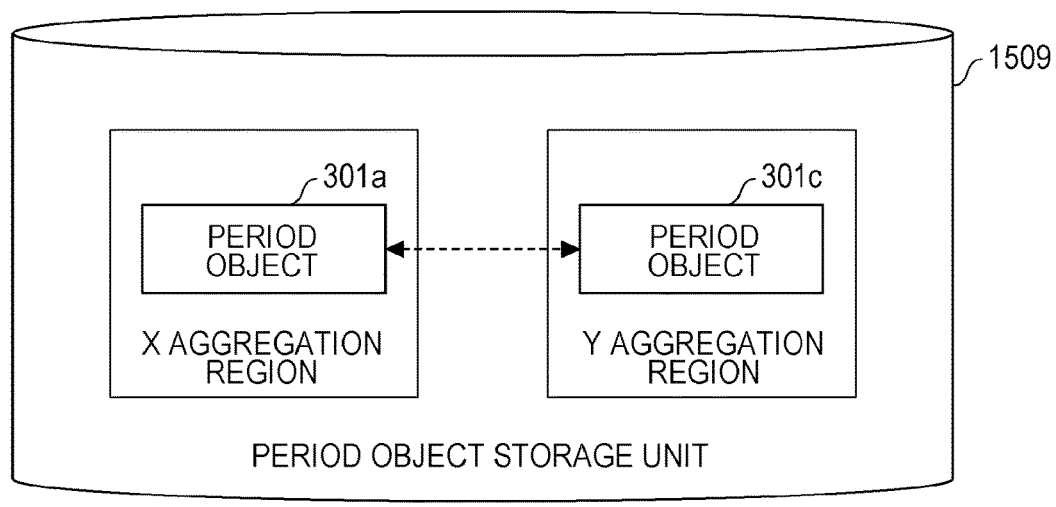
FIG. 19 is a diagram illustrating a configuration example of a period object storage unit.

FIG. 19 illustrates a configuration example of the period object storage unit 1509. The period object storage unit 1509 has an X aggregation region and a Y aggregation region. In the X aggregation region, the period object 301 (for example, the period object 301a illustrated in FIG. 3) transmitted to the storage server 105 belonging to the X aggregation is stored. In the Y aggregation region, the period object 301 (for example, the period object 301c illustrated in FIG. 3) transmitted to the storage server 105 belonging to the Y aggregation is stored. The period object 301 relates to the same period.

Figure 20:
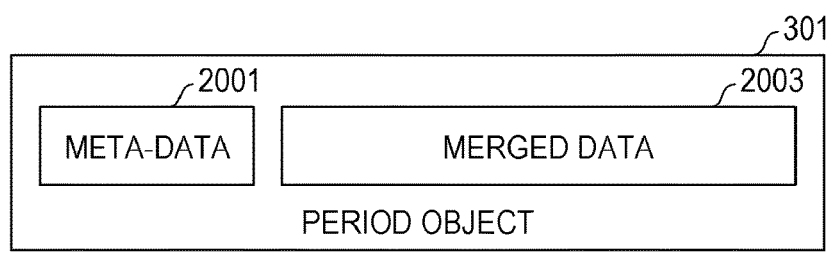
FIG. 20 is a diagram illustrating an example of a period object.

FIG. 20 illustrates an example of the period object 301. The period object 301 in this example includes meta-data 2001 and merged data 2003. The merged data 2003 is data in which the packets are coupled. The meta-data 2001 includes data regarding a period and data regarding a packet.

Figures 21, 22:
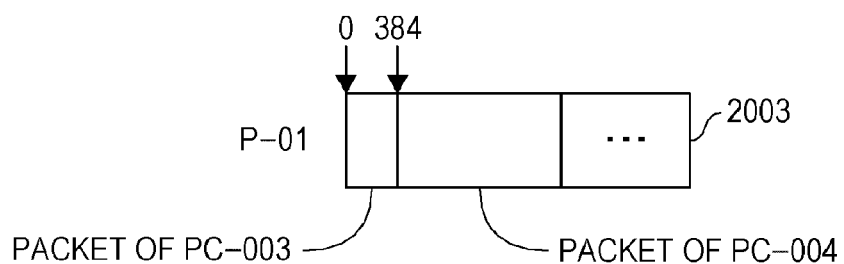
FIG. 21 is a diagram illustrating an example of meta-data in the period object.
FIG. 22 is a diagram illustrating an example of merged data in the period object.

FIG. 21 illustrates an example of the meta-data 2001 in the period object 301a. The meta-data 2001 has a header portion and a table portion. In the header portion, a field for storing the period ID, a field for storing a start date, and a field for storing an end date are provided.

The header portion in this example indicates that the meta-data 2001 corresponds to the merged data 2003 of the packets related to the capturing of the period ID "P-01". The header portion in the example indicates that the packets captured from the date "Q-01" to the date "Q-02" are collected.

In the table portion, a record is provided for each packet included in the merged data 2003. In the record, a field for storing a packet ID, a field for storing an offset, a field for storing an acquisition date, and a field for storing the session ID are provided.

The table portion in this example indicates that a first packet is specified with the packet ID "PC-003" and an offset "0" is stored in the head. The first packet is transmitted with a session identified with the ID "SS-03" and is captured on the date "T-003". The second packet is specified with a packet ID "PC-004" and an offset "384" is stored in the head. The second packet is transmitted with a session identified with the ID "SS-04" and is captured on the date "T-004".

FIG. 22 illustrates an example of the merged data 2003 in the period object 301. In the merged data 2003, the packets captured in the same period are coupled. In FIG. 22, it is indicated that a head offset in the packet with the packet ID "PC-003" is "0" and a head offset in the packet with the packet ID "PC-004" is "384".

FIG. 23 illustrates an example of the meta-data 2001 in the period object 301c. The header portion is the same as that of the case of FIG. 21. On the other hand, the table portion is different from that of the case of FIG. 21.

The table portion in this example indicates that the first packet is specified with the packet ID "PC-001" and the offset "0" is stored in the head. The first packet is transmitted with a session identified with the ID "SS-01" and is captured on the date "T-001". The second packet is specified with a packet ID "PC-002" and an offset "624" is stored in the head. The second packet is transmitted with a session identified with the ID "SS-02" and is captured on the date "T-002".

FIG. 24 illustrates an example of an aggregation table. The aggregation table in this example has a record corresponding to an aggregation. The record of the aggregation table has a field for storing a storage server ID. The storage server ID is used to specify the storage server 105 belonging to the aggregation. The number of storage servers 105 belonging to the aggregation is singular or plural.

In this example, it is indicated that the storage server 105a with the ID "SV-A" and the storage server 105b with the ID "SV-B" belong to the X aggregation. It is also indicated that the storage server 105c with the ID "SV-C" and the storage server 105d with the ID "SV-D" belong to the Y aggregation.

Figure 25:
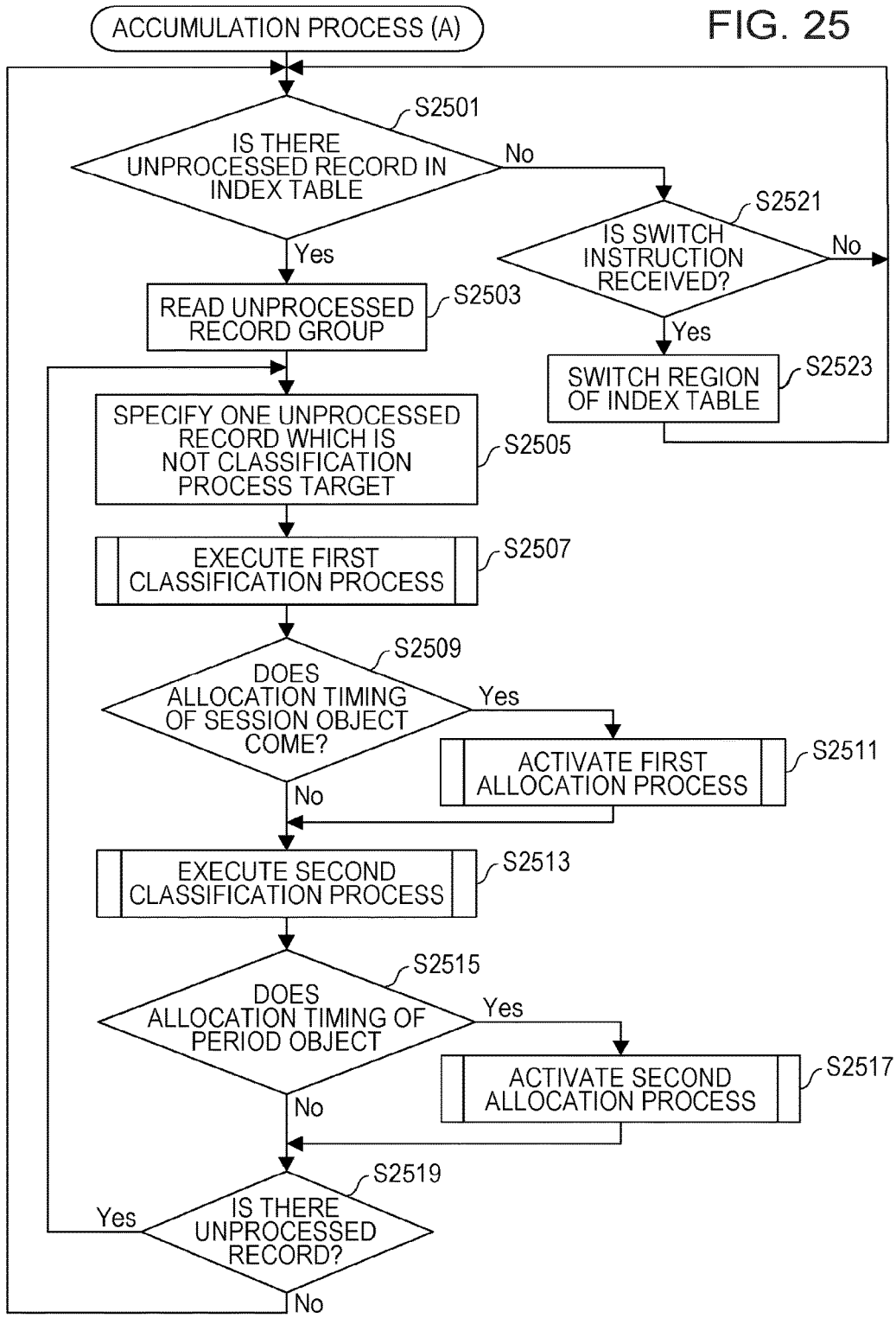
FIG. 25 is a diagram illustrating the flow of an accumulation process (A)

Next, an accumulation process by the accumulation unit 719 will be described. In the embodiment, an accumulation process (A) is executed. FIG. 25 illustrates the flow of the accumulation process (A). The read unit 1501 determines whether there is an unprocessed record in the index table of a reading source (S2501). The unprocessed record is equivalent to an index which has not yet been subjected to the first classification process and the second classification process. In a case in which the read unit 1501 determines there is the unprocessed record in the index table, the read unit 1501 reads an unprocessed record group and stores the unprocessed record group in the record storage unit 1503 (S2503).

The first classification unit 1505 executes the first classification process on each of the read records. The first classification unit 1505 specifies one unprocessed record which is not a classification process target among the records stored in the record storage unit 1503 (S2505). Then, the first classification unit 1505 executes the first classification process (S2507). In the first classification process, packets are collected for each session and the session object 201 is generated.

Figure 26:
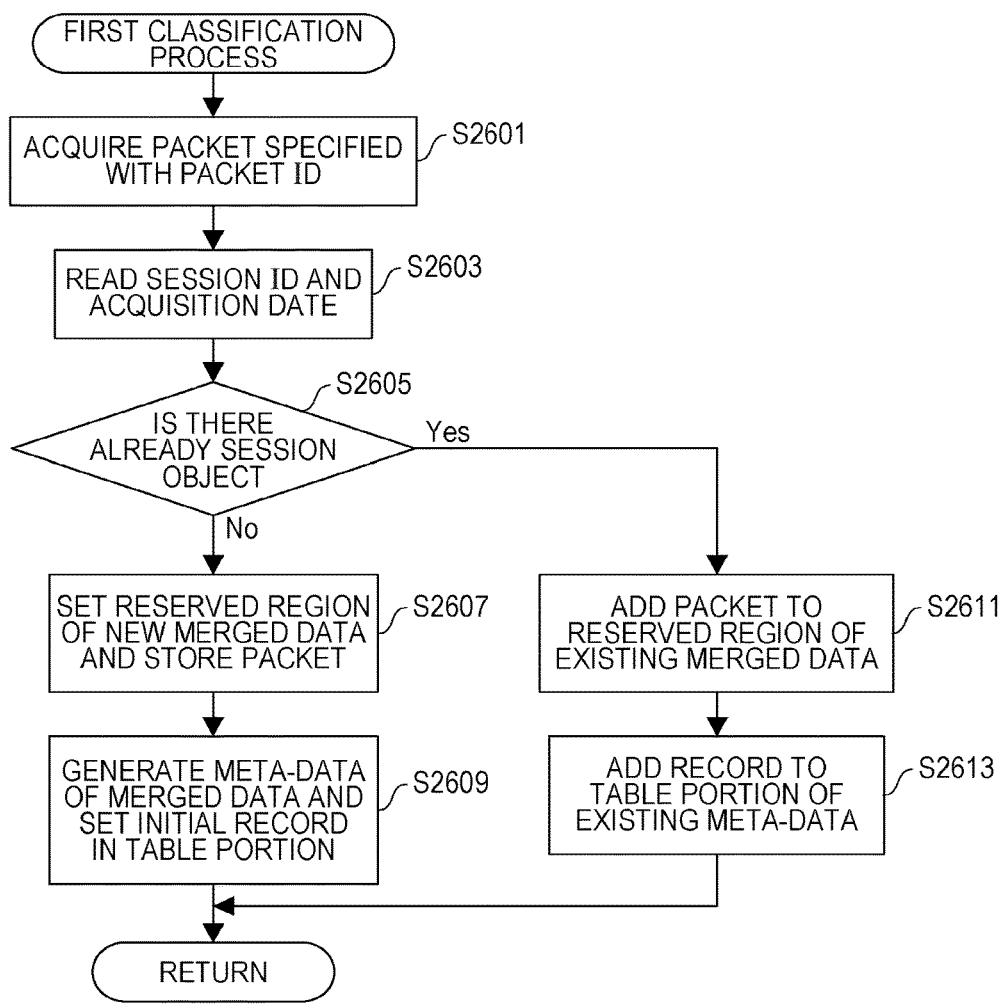
FIG. 26 is a diagram illustrating the flow of a first classification process.

FIG. 26 illustrates the flow of the first classification process. The first classification unit 1505 acquires the packet specified with the packet ID of the record specified in S2505 of FIG. 25 from the buffer 707 (S2601). The first classification unit 1505 reads the session ID and the acquisition date of the record (S2603). The first classification unit 1505 determines whether the session object 201 related to the session ID has already been provided in the session object storage unit 1507 (S2605).

In a case in which the first classification unit 1505 determines that the session object 201 related to the session ID has not yet been provided, the first classification unit 1505 first sets a reserved region of new merged data 1603 in the session object storage unit 1507 and stores the packet in the head of the region (S2607). Subsequently, the first classification unit 1505 generates the meta-data 1601 corresponding to the merged data 1603 in the session object storage unit 1507. In the header portion of the meta-data 1601, the session ID and the session data acquired from the session table are set. Then, the first classification unit 1505 sets an initial record in the table portion of the meta-data 1601 (S2609). In the record, the packet ID, the offset indicating the head of the packet, and the acquisition date are set.

Conversely, in a case in which the first classification unit 1505 determines in S2605 that the session object 201 related to the session ID has already been provided, the first classification unit 1505 adds the packet to the reserved region of the existing merged data 1603 (S2611). Then, the first classification unit 1505 adds a record to the table portion of the existing meta-data 1601 (S2613). In the record, the packet ID, the offset indicating the head of the packet, and the acquisition date are set. When the first classification process ends, the process returns to the accumulation process (A) of a calling source.

The description will be returned to FIG. 25. The first allocation unit 1511 determines whether an allocation timing of the session object 201 comes (S2509). In a case in which a predetermined time elapses from previous allocation, the first allocation unit 1511 determines that the allocation timing of the session object 201 comes. An allocation period of the session object 201 is, for example, 10 seconds.

In a case in which it is determined that the allocation timing of the session object 201 comes, the accumulation unit 719 activates the first allocation process (S2511). In this example, the first allocation process is operated as a thread. In the first allocation process, the session object 201 is allocated to the storage server 105. That is, the first allocation unit 1511 specifies the storage server 105 for each session object 201 and stores the session object 201 in the storage server 105.

Figure 27:
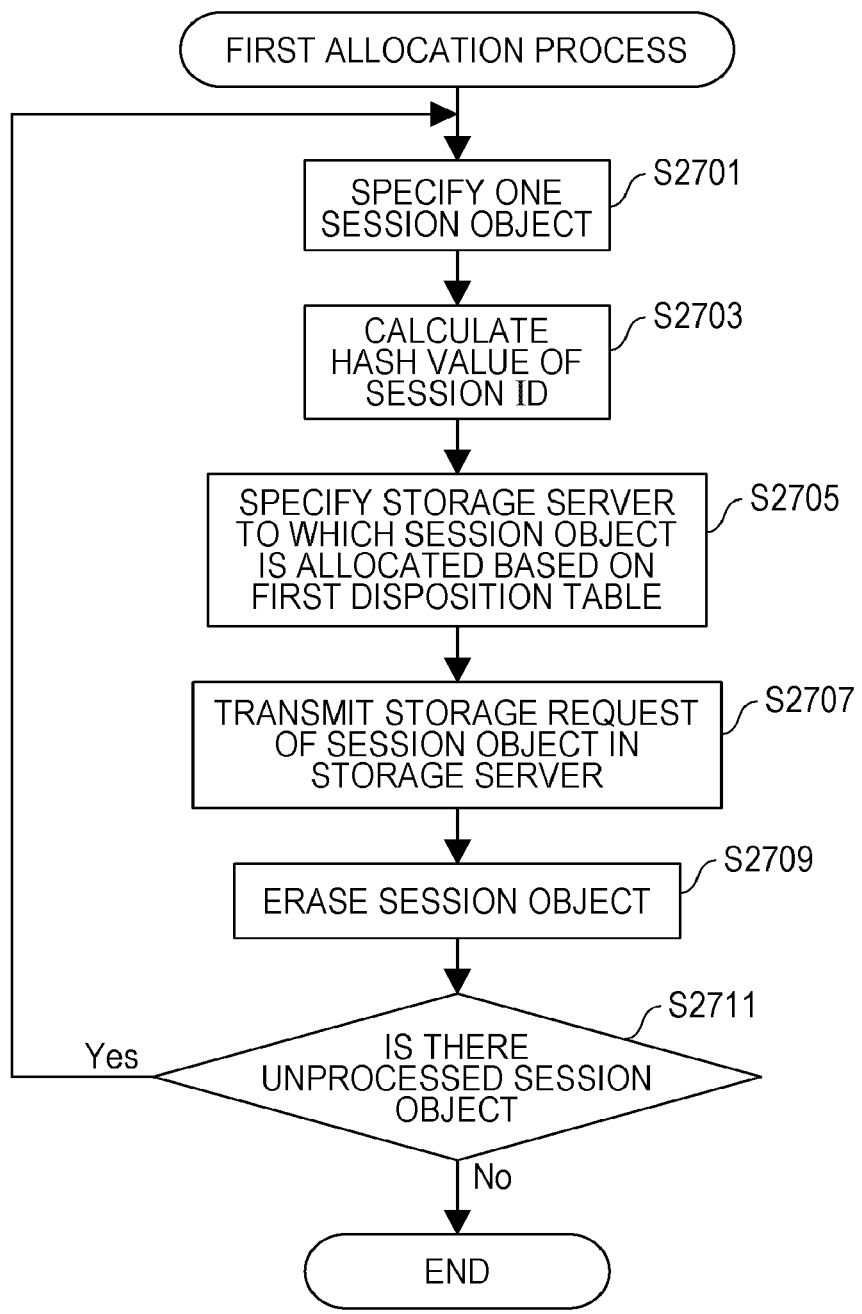
FIG. 27 is a diagram illustrating the flow of a first allocation process.

FIG. 27 illustrates the flow of the first allocation process. The first allocation unit 1511 specifies one session object 201 stored in the session object storage unit 1507 (S2701). The first allocation unit 1511 reads the session ID from the meta-data 1601 of the specified session object 201 and calculates a hash value of the session ID (S2703). Based on the first disposition table, the first allocation unit 1511 specifies the storage server 105 to which the session object 201 is allocated (S2705).

FIG. 28 illustrates an example of the first disposition table. The record of the first disposition table has a field for storing a range of the hash value of the session ID and a field for storing the storage server ID.

The range of the hash value of the session ID is used to classify the session objects 201. The storage server ID is used to identify the storage server 105 to which the session object 201 specified based on the range is allocated.

The illustrated first record indicates that the session object 201 is stored in the storage server 105*a* identified with the ID "SV-A" in a case in which the hash value of the session ID is included in a range of "0x0000 to 0x3fff" in regard to the session object 201 related to a certain session ID.

The description will be returned to FIG. 27. The first allocation unit 1511 transmits a request for storing the session object 201 to the specified storage server 105 (S2707). At this time, the session object 201 is transmitted to the storage server 105. Then, the first allocation unit 1511 erases the session object 201 (S2709).

The first allocation unit 1511 determines whether there is an unprocessed session object 201 (S2711). In a case in which it is determined that there is the unprocessed session object 201, the process returns to the process indicated in S2701 to repeat the above-described process. Conversely, in a case in which it is determined that there is no unprocessed session object 201, the first allocation process ends.

The description will be made referring back to FIG. 25. In a case in which it is determined in S2509 that the allocation timing of the session object 201 does not come, the process moves to the process of S2513 without change. In a case in which the first allocation process is activated in S2511, the process moves to S2513 without waiting to end the first allocation process.

The second classification unit 1506 executes the second classification process (S2513). In the second classification process, packets are collected for each period and the period object 301 is generated.

Figure 29:
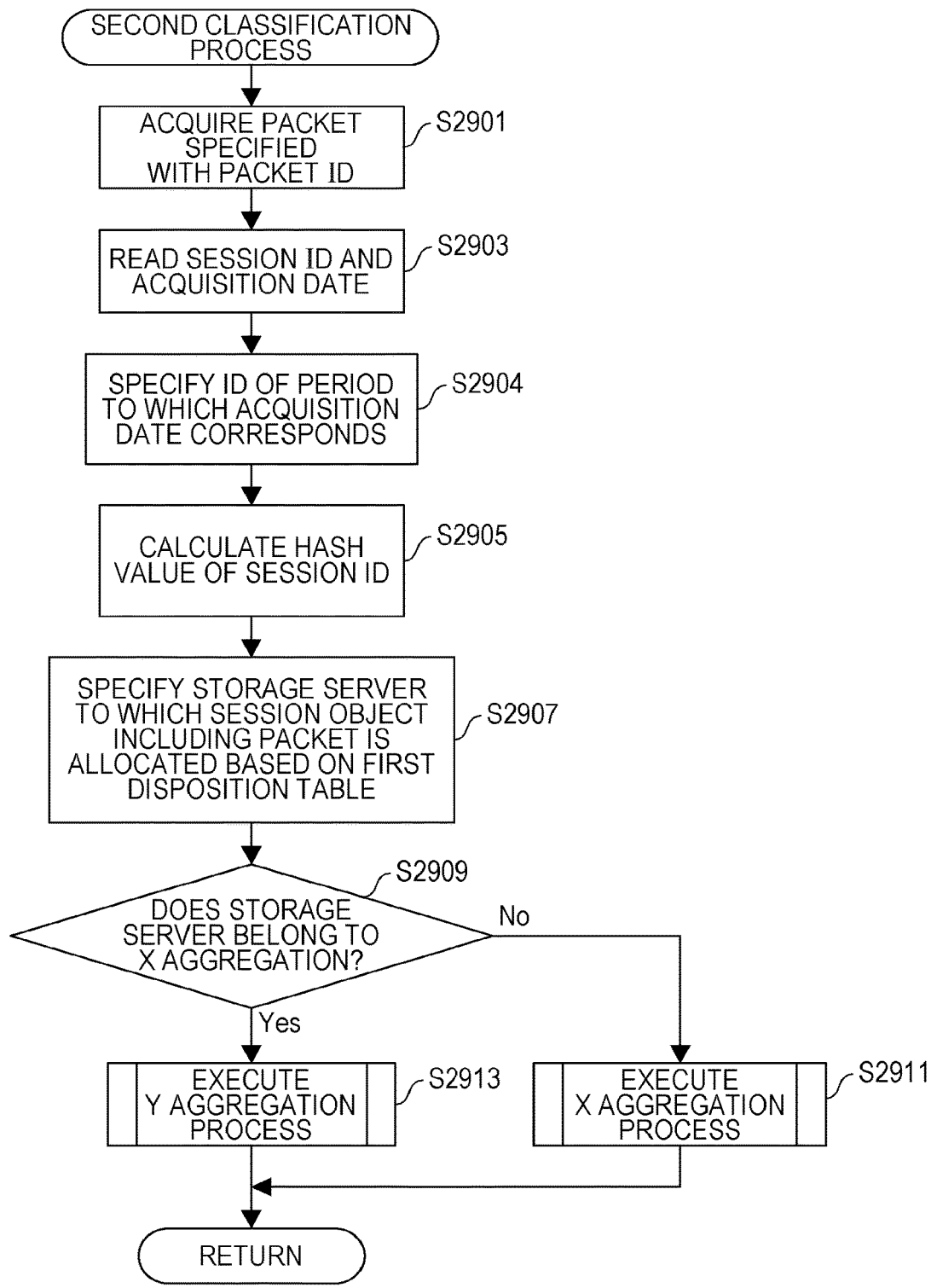
FIG. 29 is a diagram illustrating a flow example of a second classification process.

FIG. 29 illustrates a flow example of the second classification process. The second classification unit 1506 acquires the packet specified with the packet ID of the record specified in S2505 of FIG. 25 from the buffer 707 (S2901). The second classification unit 1506 reads the session ID and the acquisition date of the record (S2903). The second classification unit 1506 specifies the ID of the period including the acquisition date based on the period table (S2904).

The second classification unit 1506 calculates a hash value of the session ID (S2905). The second classification unit 1506 specifies the storage server 105 to which the session object 201 including the packets is allocated based on the first disposition table (S2907). Then, the second classification unit 1506 determines whether the storage server 105 belongs to the X aggregation (S2909).

In a case in which the second classification unit 1506 determines whether the storage server 105 specified in S2907 does not belong to the X aggregation, that is, the storage server 105 belongs the Y aggregation, the second classification unit 1506 executes an X aggregation process (S2911). In the X aggregation process, the period object 301 is generated in an X aggregation region. The X aggregation process will be described below with reference to FIG. 30.

Conversely, in a case in which the second classification unit 1506 determines whether the storage server 105 specified in S2907 belongs to the X aggregation, the second classification unit 1506 executes a Y aggregation process (S2913). In the Y aggregation process, the period object 301 is generated in a Y aggregation region. The Y aggregation process will be described below with reference to FIG. 31.

When the second classification ends, the process returns to the accumulation process (A) of the calling source.

Figure 30:
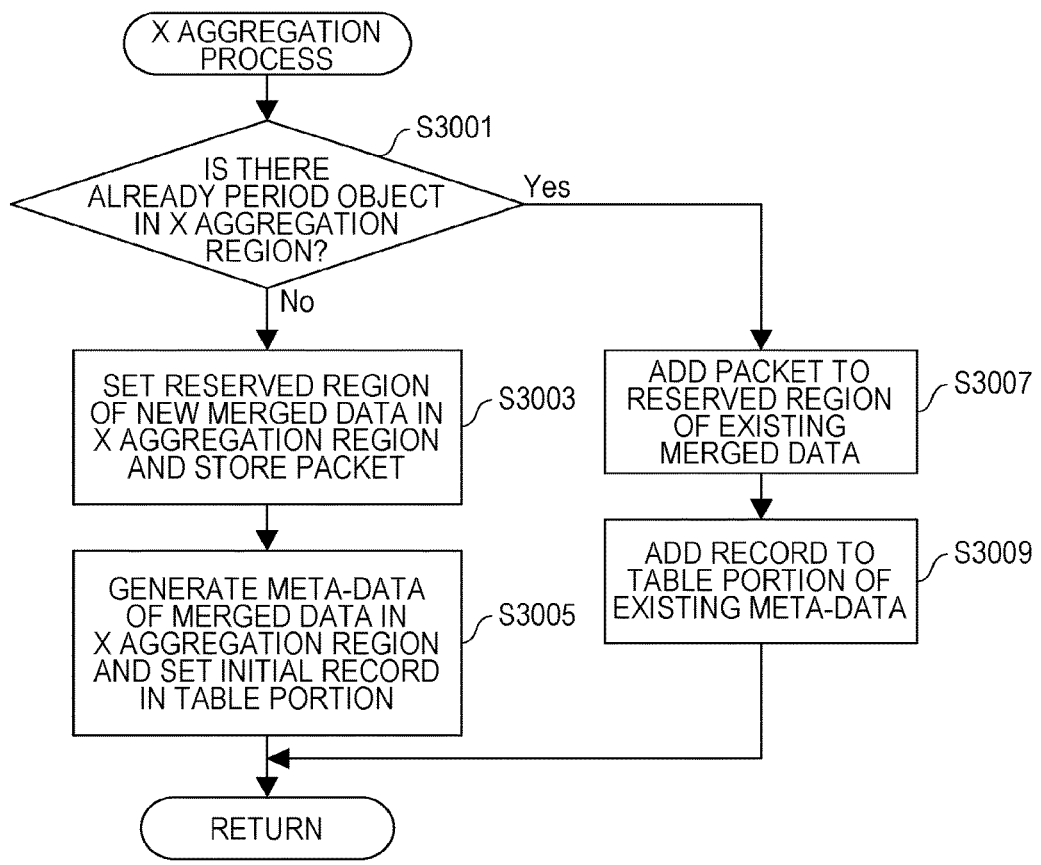
FIG. 30 is a diagram illustrating the flow of an X aggregation process.

FIG. 30 illustrates the flow of the X aggregation process. The second classification unit 1506 determines whether the period object 301 related to the period ID specified in S2904 of FIG. 29 has already been provided in the X aggregation region in the period object storage unit 1509 (S3001).

In a case in which the second classification unit 1506 determines that the period object 301 related to the period ID has not yet been provided, the second classification unit 1506 first sets a reserved region of the new merged data 2003 in the X aggregation region and stores the packet in the head of the region (S3003). Subsequently, the second classification unit 1506 generates the meta-data 2001 corresponding to the merged data 2003 in the X aggregation region. In the header portion of the meta-data 2001, the period ID and acquisition start and end dates from the period table are set. The second classification unit 1506 sets an initial record in the table portion of the meta-data 2001 (S3005). In the record, the packet ID, the offset indicating the head of the packet, the acquisition date, and the session ID are set.

In a case in which the second classification unit 1506 determines that the period object 301 related to the period ID has already been provided, the second classification unit 1506 adds a packet to the reserved region of the existing merged data 2003 (S3007). Then, the second classification unit 1506 adds a record to the table portion of the existing meta-data 2001 (S3009). In the record, the packet ID, the offset indicating the head of the packet, the acquisition date, and the session ID are set. When the X aggregation process ends, the process returns to the second classification process of the calling source.

Figure 31:
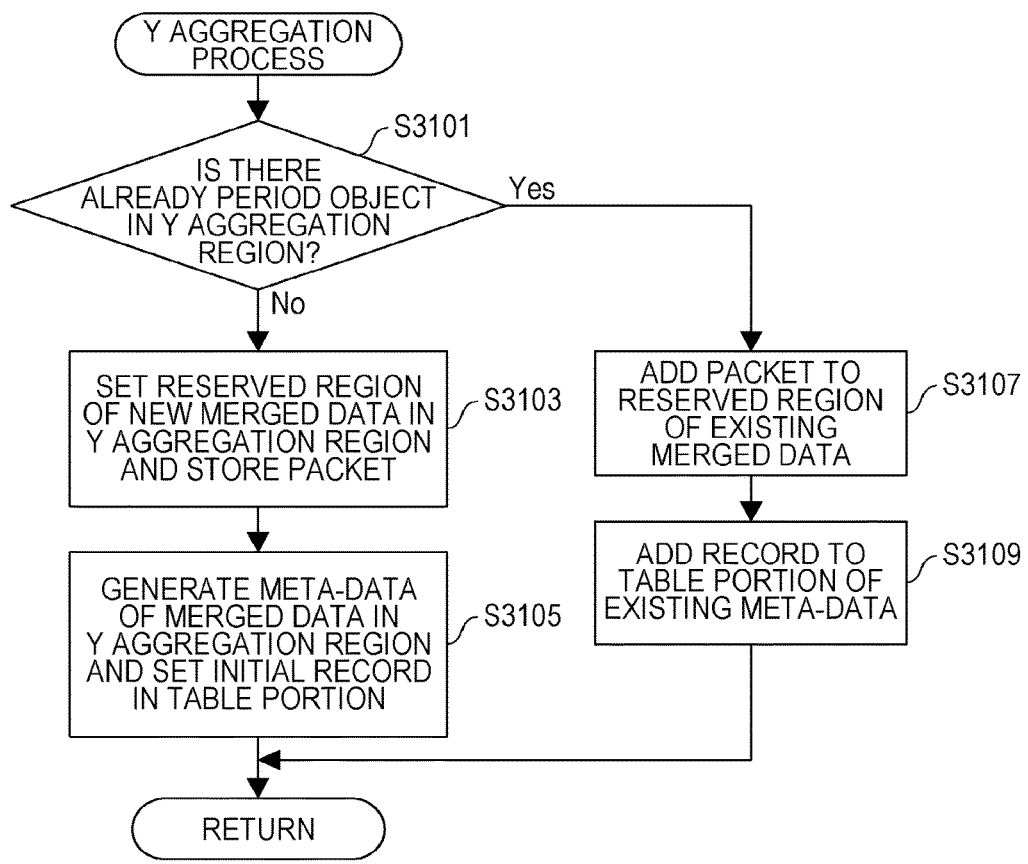
FIG. 31 is a diagram illustrating the flow of a Y aggregation process.

FIG. 31 illustrates the flow of the Y aggregation process. The second classification unit 1506 determines whether the period object 301 related to the period ID specified in S2904 of FIG. 29 has already been provided in the Y aggregation region in the period object storage unit 1509 (S3101).

In a case in which the second classification unit 1506 determines that the period object 301 related to the period ID has not yet been provided, the second classification unit 1506 first sets a reserved region of the new merged data 2003 in the Y aggregation region and stores the packet in the head of the region (S3103). Subsequently, the second classification unit 1506 generates the meta-data 2001 corresponding to the merged data 2003 in the Y aggregation region. In the header portion of the meta-data 2001, the period ID and acquisition start and end dates from the period table are set. The second classification unit 1506 sets an initial record in the table portion of the meta-data 2001 (S3105). In the record, the packet ID, the offset indicating the head of the packet, the acquisition date, and the session ID are set.

In a case in which the second classification unit 1506 determines that the period object 301 related to the period ID has already been provided, the second classification unit 1506 adds a packet to the reserved region of the existing merged data 2003 (S3107). Then, the second classification unit 1506 adds a record to the table portion of the existing meta-data 2001 (S3109). In the record, the packet ID, the offset indicating the head of the packet, the acquisition date, and the session ID are set. When the Y aggregation process ends, the process returns to the second classification process of the calling source.

The description will be made referring back to FIG. 25. When the second classification process of S2513 ends, the second allocation unit 1512 determines whether an allocation timing of the period object 301 comes (S2515). In a case in which an end date of the current period comes, the second allocation unit 1512 determines that the allocation timing of the period object 301 comes.

In a case in which it is determined that the allocation timing of the period object 301 comes, the accumulation unit 719 activates the second allocation process (S2517). In this example, the second allocation process is operated as a thread. In the second allocation process, the period object 301 is allocated to the storage server 105. That is, the second allocation unit 1512 specifies the storage server 105 corresponding to the period object 301 and stores the period object 301 in the storage server 105.

Figure 32:
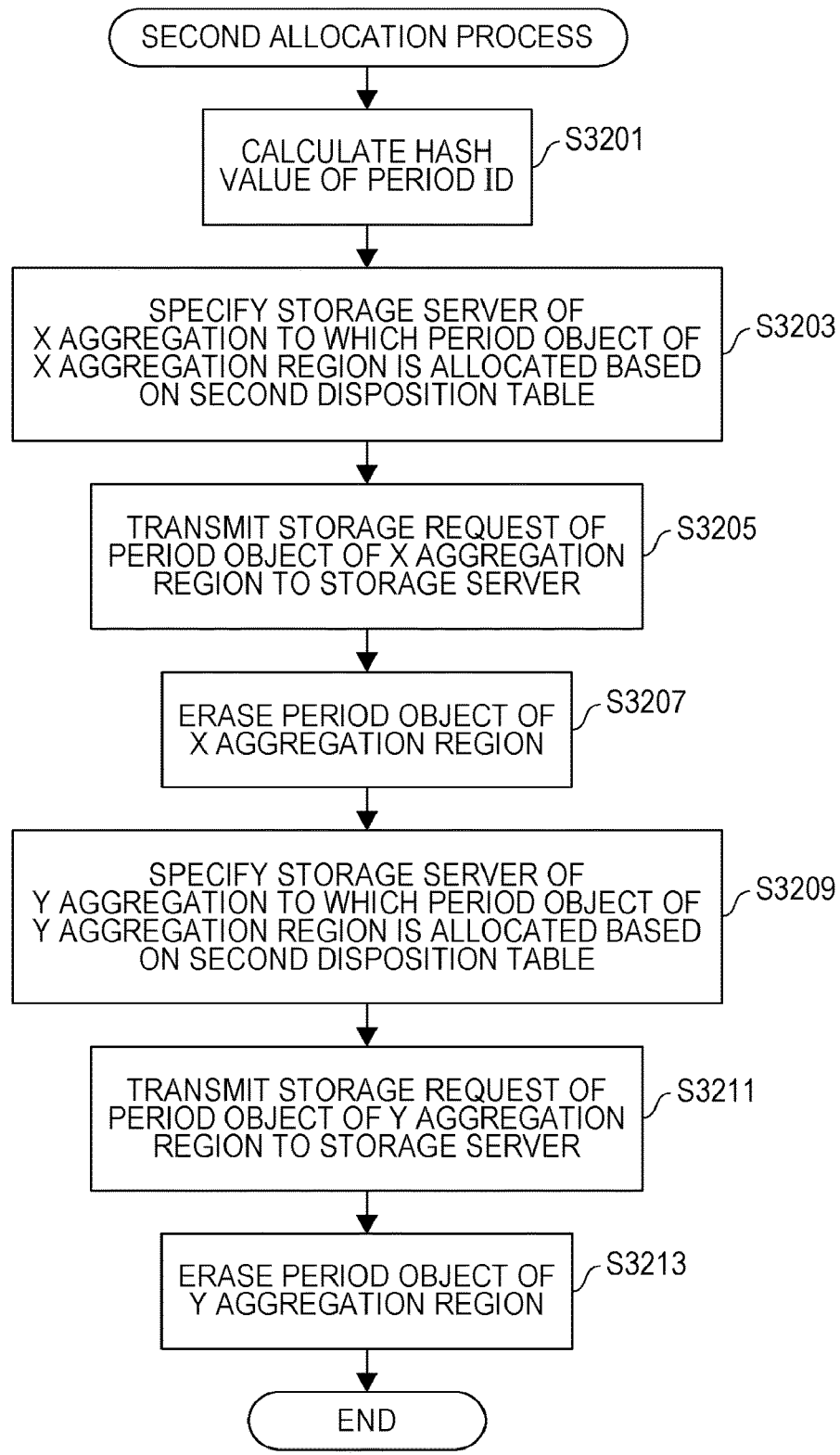
FIG. 32 is a diagram illustrating the flow of a second allocation process.

FIG. 32 illustrates the flow of the second allocation process. The second allocation unit 1512 calculates a hash value of the ID of the period determined to end in S2515 of FIG. 25 (S3201). The second allocation unit 1512 specifies the storage server ID of the X aggregation corresponding to a range including the hash value of the period ID based on the second disposition table. That is, the storage server 105 to which the period object 301 of the X aggregation region is allocated is specified (S3203).

FIG. 33 illustrates an example of the second disposition table. The record of the second disposition table has a field for storing a range of the hash value of the period ID, a field for storing the storage server ID of the X aggregation, and a field for storing the storage server ID of the Y aggregation.

The range of the hash value of the period ID is used to classify the period objects 301. The storage server ID of the X aggregation is used to identify the storage server 105 of the X aggregation to which the period object 301 specified based on the range is stored. The storage server ID of the Y aggregation is used to identify the storage server 105 of the Y aggregation to which the period object 301 specified based on the range is stored.

The illustrated first record indicates that the period object 301 of the X aggregation region is stored in the storage server 105*a* identified with the ID "SV-A" and the period object 301 of the Y aggregation region is stored in the storage server 105*c* identified with the ID "SV-C" in a case in which the hash value of the period ID is included in a range of "0x0000 to 0x3fff" in regard to the two period objects 301 related to certain period IDs.

The description will be made referring back to FIG. 32. The second allocation unit 1512 transmits a request for storing the period object 301 of the X aggregation region to the storage server 105 specified in S3203 (S3205). Thereafter, the second allocation unit 1512 erases the period object 301 of the X aggregation region (S3207).

Next, the second allocation unit 1512 specifies the storage server ID of the Y aggregation corresponding to the range including the hash value of the period ID based on the second disposition table. That is, the storage server 105 to which the period object 301 of the Y aggregation region is allocated is specified (S3209).

The second allocation unit 1512 transmits a request for storing the period object 301 of the Y aggregation region to the storage server 105 specified in S3209 (S3211). Thereafter, the second allocation unit 1512 erases the period object 301 of the Y aggregation region (S3213). Then, the second allocation process ends.

The description will be made referring back to FIG. 25. In a case in which it is determined in S2515 that the allocation timing of the period object 301 does not come, the process moves to S2519 without change. In a case in which the second allocation process is activated in S2517, the process moves to S2519 without waiting to end the second allocation process.

The first classification unit 1505 determines whether there is an unprocessed record in the record group read in S2503 (S2519). In a case in which it is determined that there is the unprocessed record, the process returns to S2505 to repeat the above-described processes.

Conversely, in a case in which it is determined that there is no unprocessed record, the process returns to S2501 to repeat the above-described processes.

The description will be made referring back to S2501. In a case in which it is determined in S2501 that there is no unprocessed record in the index table, the second switch unit 1517 determines whether a switch instruction is received from the first switch unit 1205 of the analysis unit 709 (S2521). In a case in which the second switch unit 1517 determines that the switch instruction is received, the second switch unit 1517 switches a region of the index table which is a source from which the first classification unit 1505 and the second classification unit 1506 read the indexes (S2523). Then, the process returns to S2501 to repeat the above-described processes.

Figure 34:
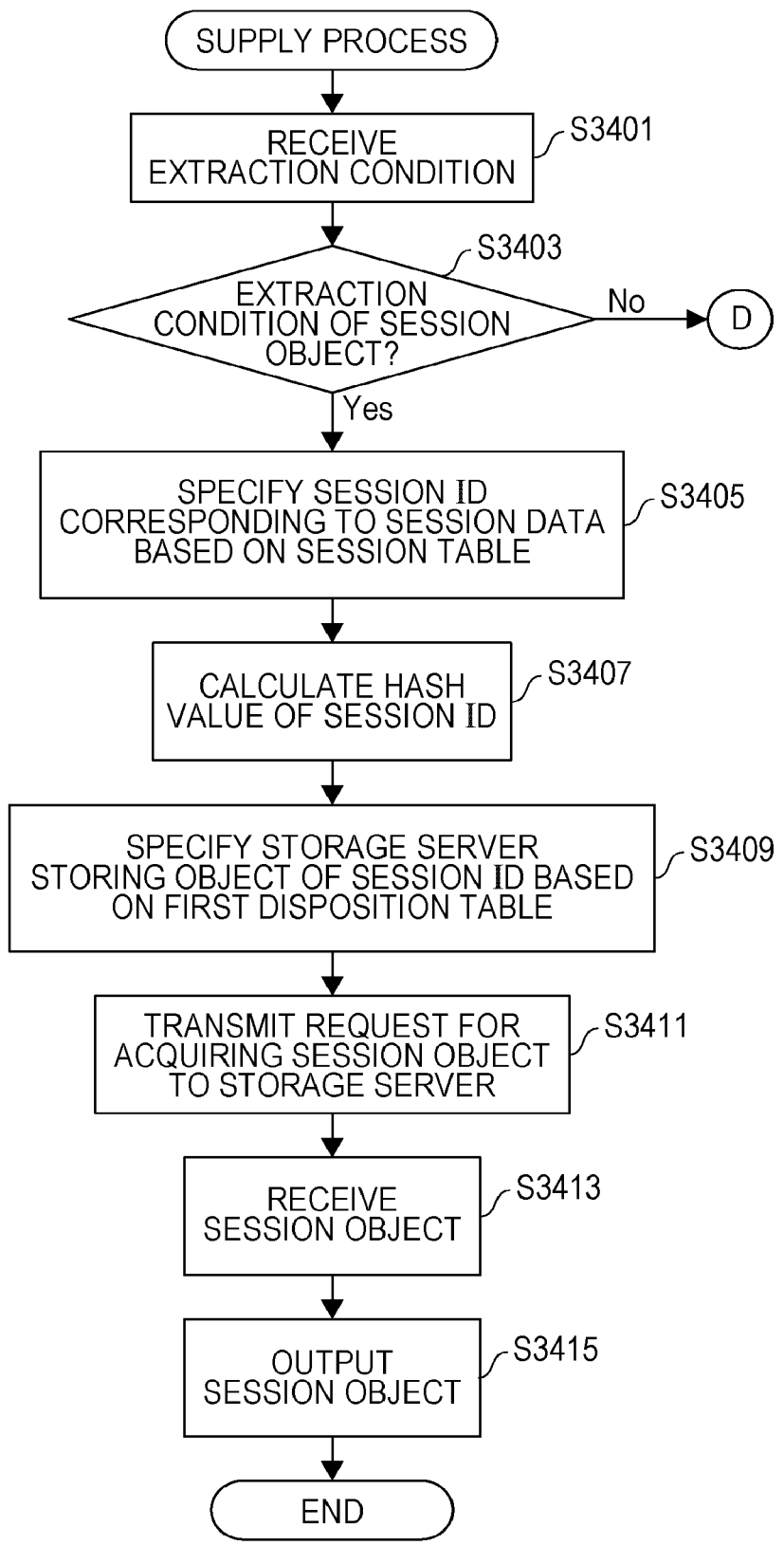
FIG. 34 is a diagram illustrating the flow of a supply process.

Next, a supply process by the supply unit 725 will be described. FIG. 34 illustrates the flow of the supply process. The supply unit 725 receives an extraction condition via, for example, the reception unit 723 (S3401). The supply unit 725 determines whether the extraction condition is the extraction condition of the session object 201 (S3403). In a case in which the extraction condition is the extraction condition of the session object 201, session data is assumed to be included in the extraction condition.

In a case in which it is determined that the extraction condition is the extraction condition of the session object 201, the supply unit 725 specifies the session ID corresponding to the session data included in the extraction condition based on the session table (S3405). The supply unit 725 calculates a hash value of the session ID (S3407). The supply unit 725 reads the storage server ID corresponding to the hash value based on the first disposition table. That is, the storage server 105 storing the object of the session ID is specified (S3409).

The supply unit 725 transmits a request for acquiring the session object 201 to the storage server 105 via the transmission unit 721 (S3411). The session ID is included in the request for the acquiring the session object 201. The supply unit 725 receives the session object 201 via the reception unit 723 (S3413). Then, the supply unit 725 outputs the session object 201 via, for example, the transmission unit 721 (S3415) and ends the supply process.

The description will be made referring back to S3403. In a case in which it is determined in S3403 that the extraction condition is not the extraction condition of the session object 201, that is, a case in which the extraction condition is the extraction condition of the period object 301, the process moves to S3501 illustrated in FIG. 35 via a terminal D. In a case in which the extraction condition is the extraction condition of the period object 301, a period is assumed to be designated in the extraction condition.

The description will be made with reference to FIG. 35. The supply unit 725 extracts the period ID corresponding to the designated period based on the period table (S3501). It is assumed that there is a condition in which the plurality of period IDs are extracted.

The supply unit 725 specifies one period ID (S3503). The supply unit 725 calculates the hash value of the period ID (S3505). The supply unit 725 reads the storage server ID of the X aggregation corresponding to the hash value based on the second disposition table. That is, the storage server 105 of the X aggregation storing the object of the period ID is specified (S3507).

The supply unit 725 transmits a request for acquiring the period object 301 to the storage server 105 of the X aggregation via the transmission unit 721 (S3509). The period ID is included in the request for acquiring the period object 301. The supply unit 725 receives the period object 301 via the reception unit 723 (S3511). Then, the process moves to S3601 illustrated in FIG. 36 via a terminal E.

The description will be made with reference to FIG. 36. The supply unit 725 reads the storage server ID of the Y aggregation corresponding to the hash value of the period ID based on the second disposition table. That is, the storage server 105 of the Y aggregation storing the object of the period ID is specified (S3601).

The supply unit 725 transmits a request for acquiring the period object 301 to the storage server 105 of the Y aggregation via the transmission unit 721 (S3603). The supply unit 725 receives the period object 301 via the reception unit 723 (S3605). The supply unit 725 merges the period object 301 received in S3511 of FIG. 35 and the period object 301 received in S3605 and sorts the packets in an ascending order of the acquisition dates (S3607).

The supply unit 725 outputs the sorted period objects 301 via, for example, the transmission unit 721 (S3611).

The supply unit 725 determines whether there is the unspecified period ID in S3503 (S3613). In a case in which it is determined that there is the unspecified period ID, the process returns to S3503 illustrated in FIG. 35 via a terminal F to repeat the above-described processes. Conversely, in a case in which it is determined that there is no unspecified period ID, the supply process ends.

Figure 35:
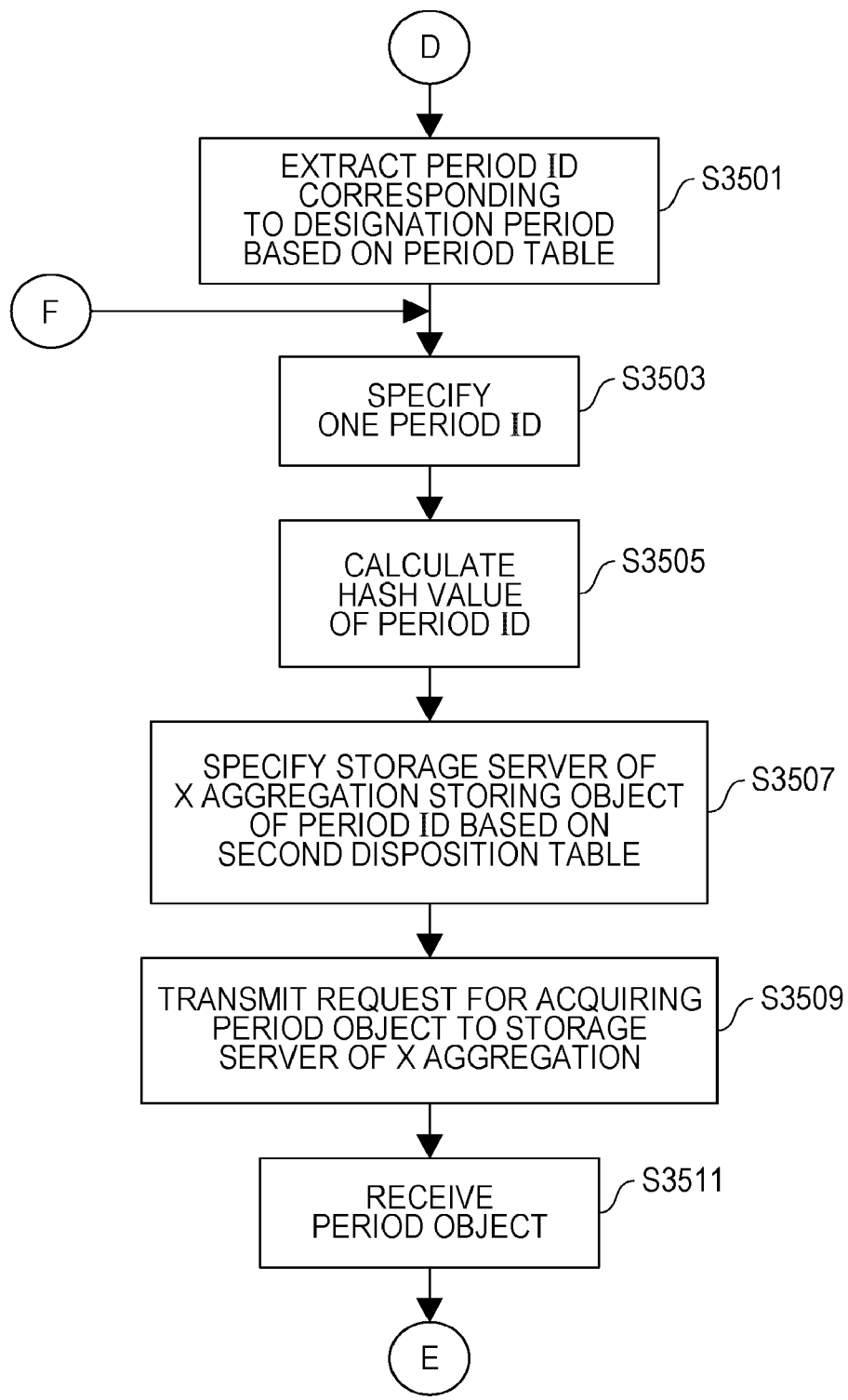
FIG. 35 is a diagram illustrating the flow of a supply process.
Figure 36:
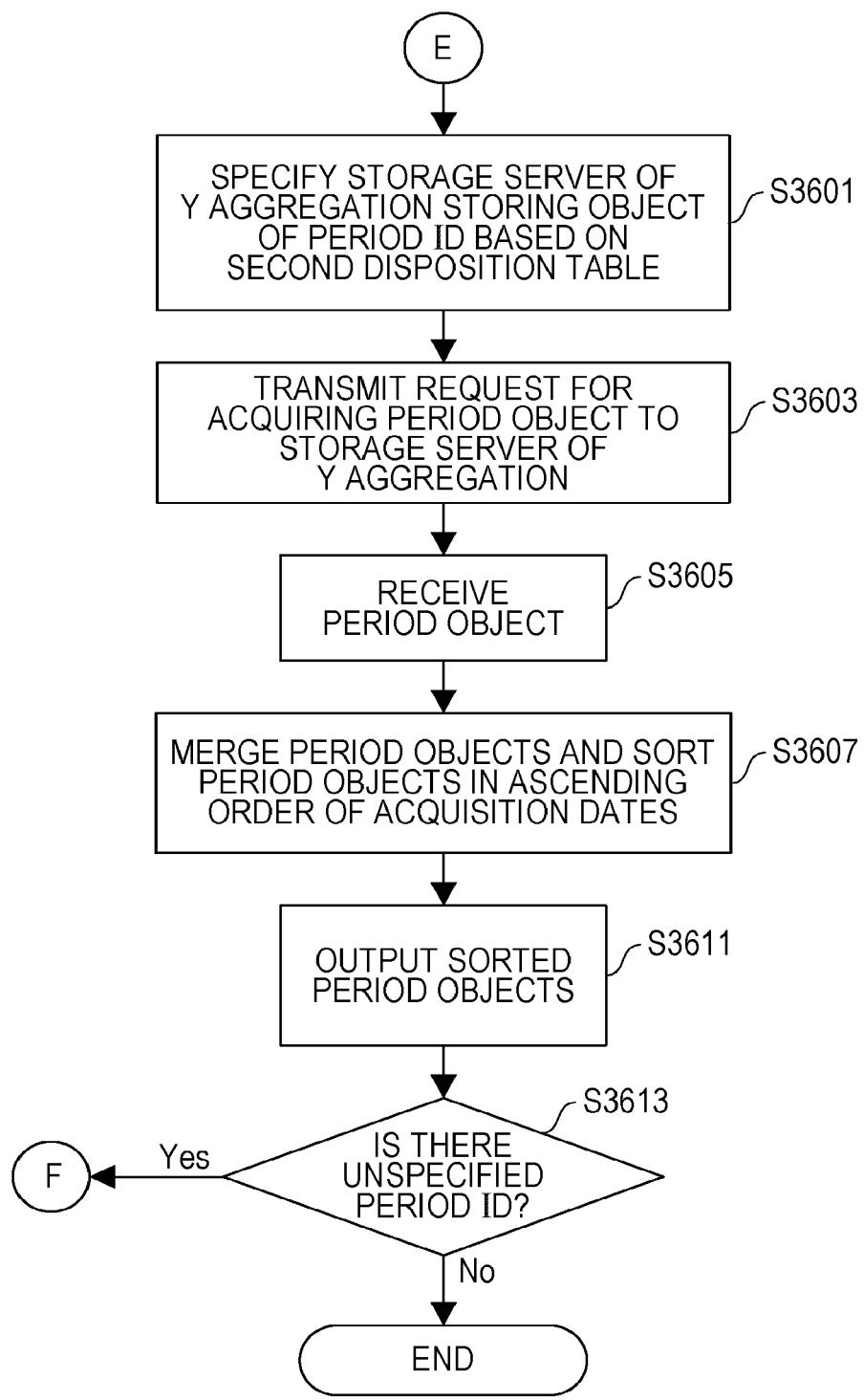
FIG. 36 is a diagram illustrating the flow of a supply process.

The processes illustrated in FIGS. 34 to 36 are an example of the supply process. The supply unit 725 may transmit the extraction condition to each storage server 105. Each storage server 105 may specify the session object and the period object maintained by the self-storage server 105 according to the extraction condition. The operation of the capture server 101 has been described above.

Figure 37:
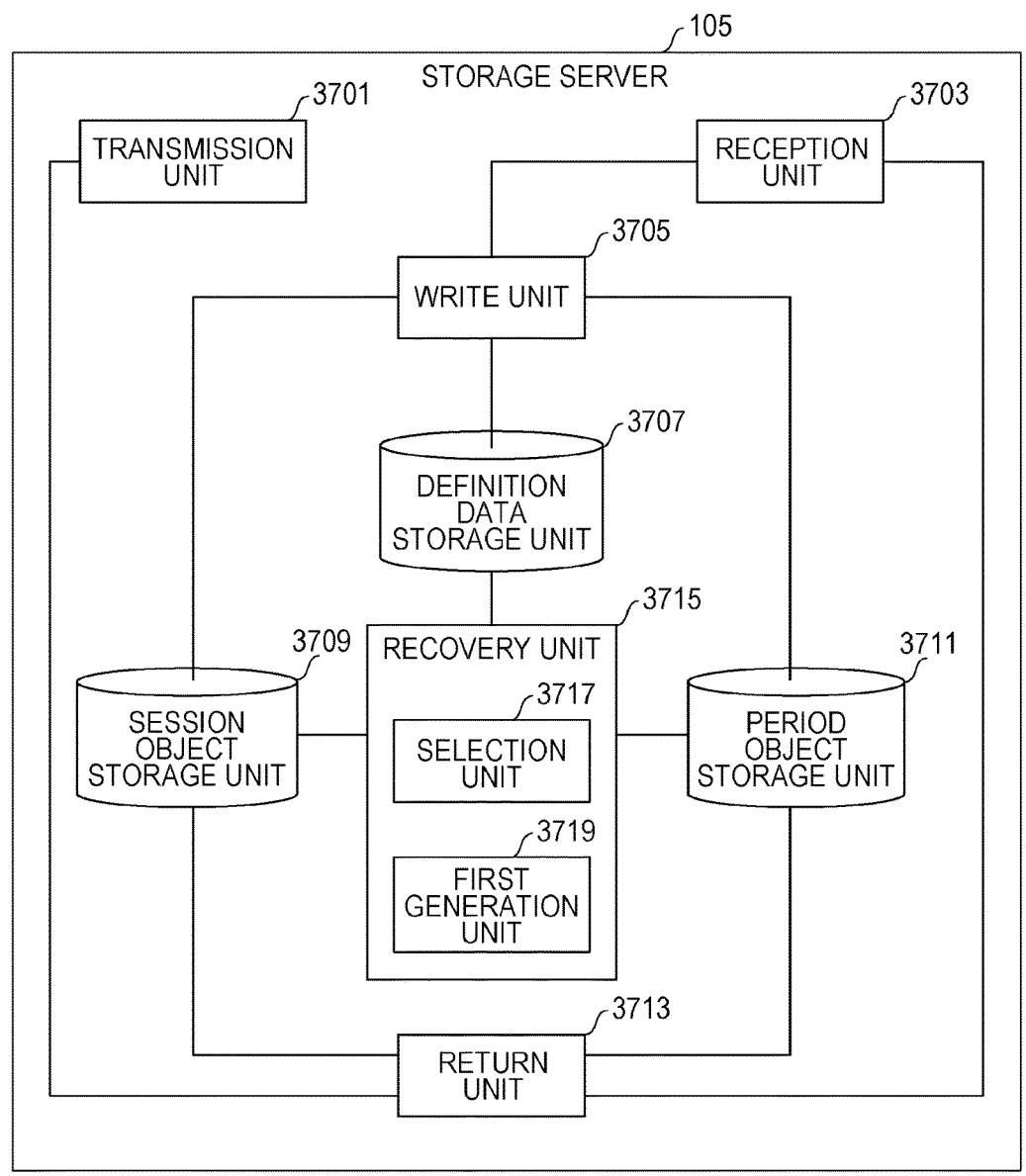
FIG. 37 is a diagram illustrating a module configuration example of a storage server.

Next, an operation of the storage server 105 will be described. FIG. 37 illustrates a module configuration example of the storage server 105. The storage server 105 includes a transmission unit 3701, a reception unit 3703, a write unit 3705, a definition data storage unit 3707, a session object storage unit 3709, a period object storage unit 3711, a return unit 3713, and a recovery unit 3715.

The transmission unit 3701 transmits various kinds of data via the transmission network. The reception unit 3703 receives various kinds of data via the transmission network. The write unit 3705 writes the various kinds of data. The definition data storage unit 3707 stores the same data (the session table and the period table) as the definition data storage unit 717 of the capture server 101. The session object storage unit 3709 stores the session object 201. The period object storage unit 3711 stores the period object 301. The return unit 3713 returns the session object 201 or the period object 301 in response to an acquisition request from the capture server 101.

The recovery unit 3715 executes a process of recovering the lost session object 201 and period object 301. The recovery unit 3715 includes a selection unit 3717 and a first generation unit 3719. The selection unit 3717 executes the first selection process and the second selection process. The first generation unit 3719 executes the first generation process and the second generation process.

The transmission unit 3701, the reception unit 3703, the write unit 3705, the return unit 3713, the recovery unit 3715, the selection unit 3717, and the first generation unit 3719 described above are realized using hardware resources (for example, see FIG. 51) and a program causing a processor to execute processes to be described below.

The definition data storage unit 3707, the session object storage unit 3709, and the period object storage unit 3711 described above are realized using hardware resources (for example, see FIG. 51).

Figure 38:
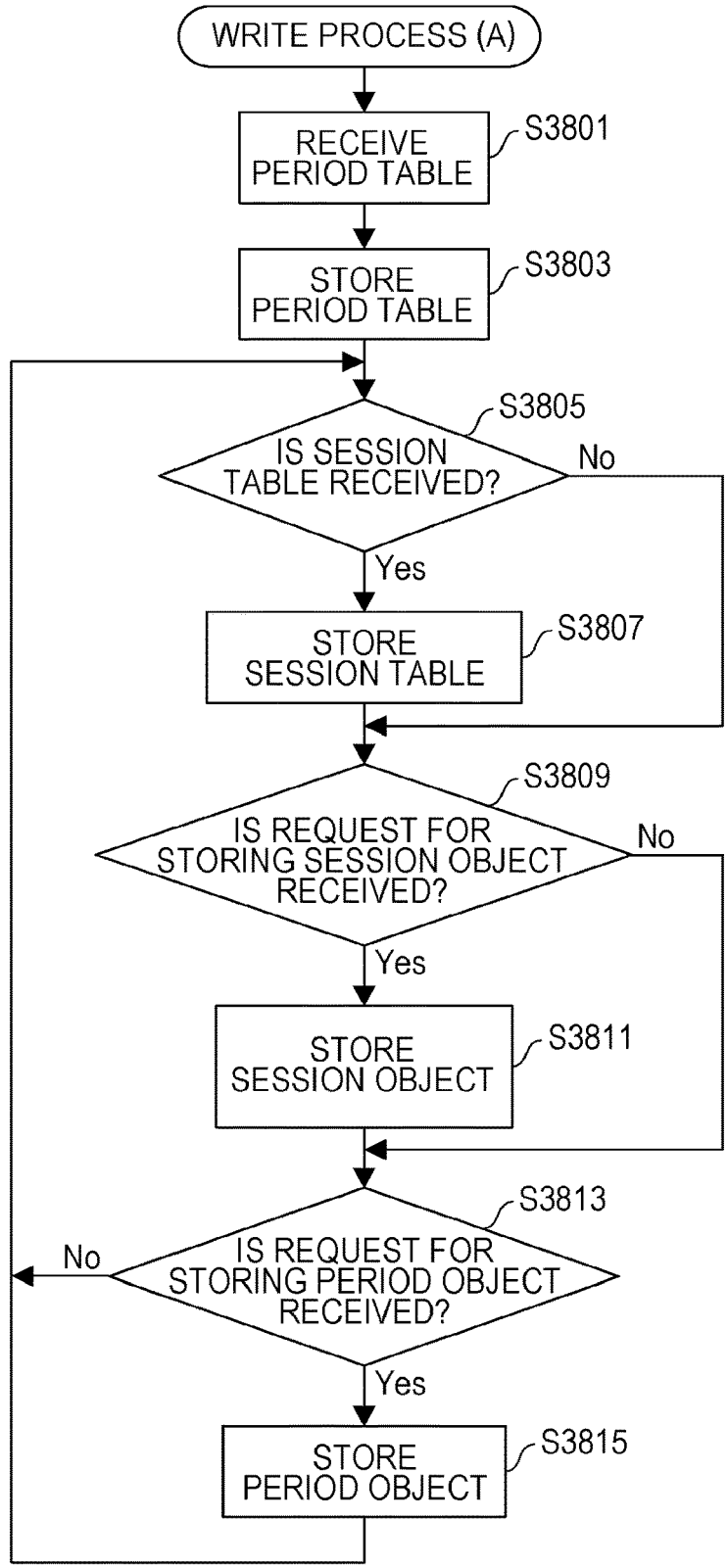
FIG. 38 is a diagram illustrating the flow of a write process (A)

Next, a write process by the write unit 3705 will be described. In the embodiment, the write process (A) is executed. FIG. 38 illustrates the flow of the write process (A). When the reception unit 3703 receives the period table (S3801), the write unit 3705 stores the received period table in the definition data storage unit 3707 (S3803).

The write unit 3705 determines whether the reception unit 3703 receives the session table (S3805). On the other hand, in a case in which it is determined that the session table is received, the write unit 3705 stores the received session table in the definition data storage unit 3707 (S3807). In case in which it is determined that the session table is not received, the process moves to S3809 without change.

The write unit 3705 determines whether the reception unit 3703 receives a request for storing the session object 201 (S3809). In a case in which it is determined that the request for storing the session object 201 is received, the write unit 3705 stores the session object 201 in the session object storage unit 3709 (S3811). Conversely, in a case in which it is determined that the request for storing the session object 201 is not received, the process moves to S3813 without change.

The write unit 3705 determines whether the reception unit 3703 receives a request for storing the period object 301 (S3813). In a case in which it is determined that the request for storing the period object 301 is received, the write unit 3705 stores the period object 301 in the period object storage unit 3711 (S3815). Then, the process returns to S3805 to repeat the above-described processes. Conversely, in a case in which it is determined that the request for storing the period object 301 is not received, the process returns to S3805 without change to repeat the above-described processes.

The process illustrated in FIG. 38 is an example of the write process. The storage server 105 may generate the session table regarding the session object 201 maintained by the self-storage server 105. In this case, the processes of S3805 and S3807 may be omitted. The storage server 105 may generate the period table regarding the period object 301 maintained by the self-storage server 105. In this case, the processes of S3801 and S3803 may be omitted.

Figure 39:
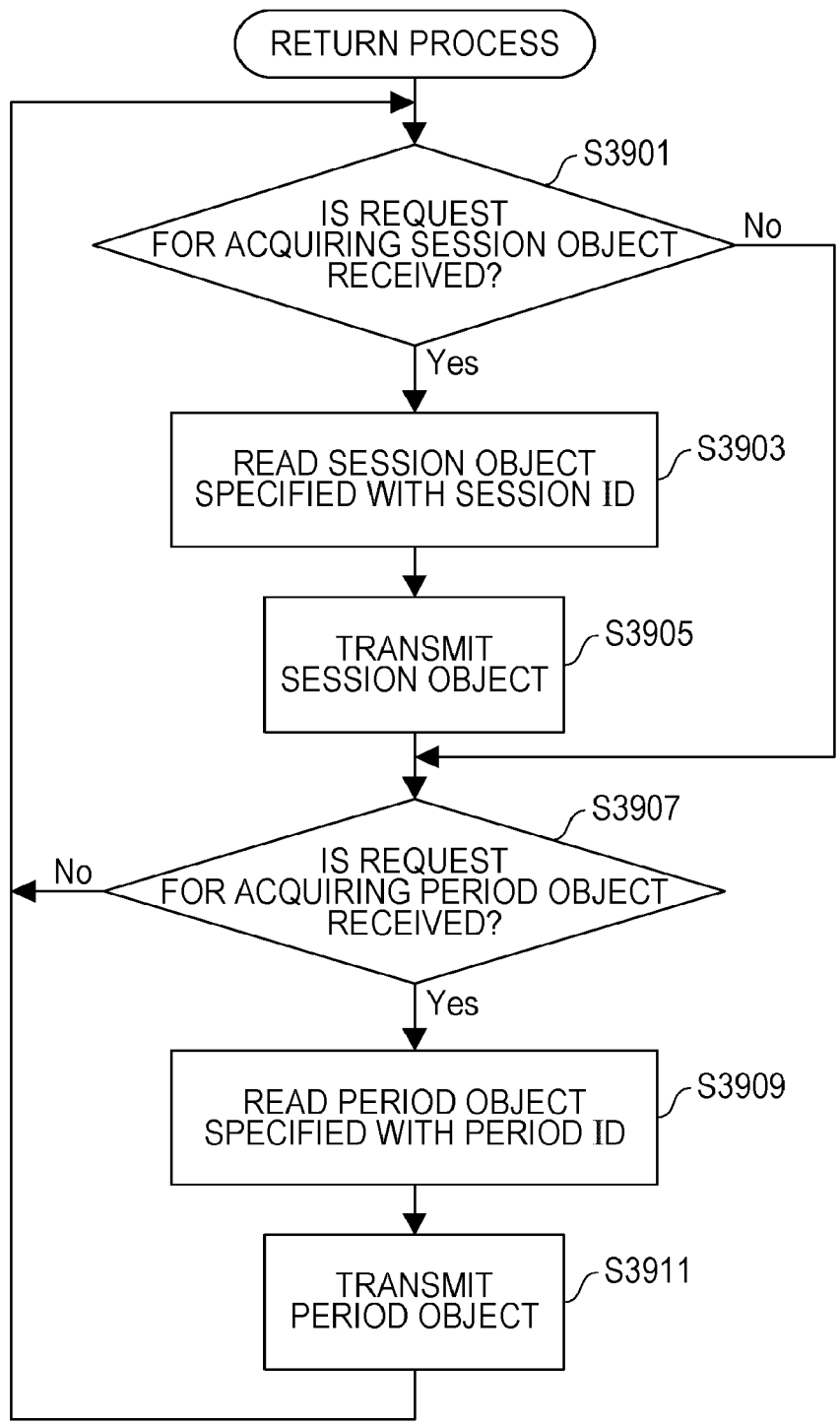
FIG. 39 is a diagram illustrating the flow of a return process.

Next, a return process by the return unit 3713 will be described. FIG. 39 illustrates the flow of the return process. The return unit 3713 determines whether the reception unit 3703 receives the request for acquiring the session object 201 (S3901). In a case in which the return unit 3713 determines that the request for acquiring the session object 201 is received, the return unit 3713 reads the session object 201 specified with the session ID included in the request for acquiring the session object 201 (S3903). Then, the return unit 3713 transmits the session object 201 to a request source via the transmission unit 3701 (S3905). In a case in which it is determined that the request for acquiring the session object 201 is not received, the process moves to S3907 without change.

The return unit 3713 determines whether the reception unit 3703 receives a request for acquiring the period object 301 (S3907). In a case in which the return unit 3713 determines that the request for acquiring the period object 301 is received, the return unit 3713 reads the period object 301 specified with the period ID included in the request for acquiring the period object 301 (S3909). Then, the return unit 3713 transmits the period object 301 to a request source via the transmission unit 3701 (S3911). In a case in which it is determined that the request for acquiring the period object 301 is not received, the process returns to S3901.

The process illustrated in FIG. 39 is an example of the return process. The return unit 3713 may specify the session object 201 and the period object 301 maintained by the self-storage server according to the extraction condition received by the reception unit 3703.

Figure 40:
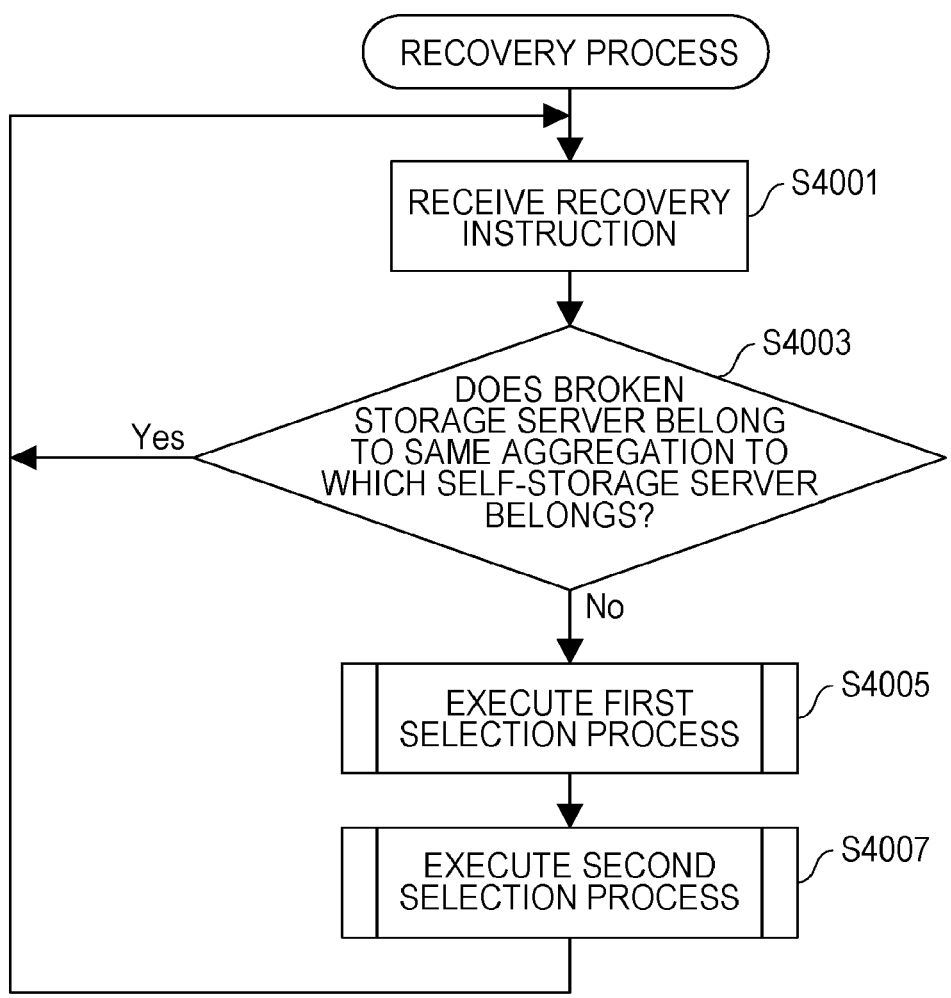
FIG. 40 is a diagram illustrating the flow of a recovery process.

Finally, a recovery process by the recovery unit 3715 will be described. FIG. 40 illustrates the flow of the recovery process. When the reception unit 3703 receives a recovery instruction (S4001), the recovery unit 3715 determines whether the broken storage server 105 belongs to the same aggregation as the self-storage server 105 based on the aggregation table (S4003). The recovery instruction is assumed to include the ID of the broken storage server 105 and the ID of the storage server 105 which is a new storage destination. In a case in which it is determined that the broken storage server 105 belongs to the same aggregation as the self-storage server 105, the process returns to S4001 to repeat the above-described processes.

In a case in which it is determined that the broken storage server 105 belongs to a different aggregation from the self-storage server 105, the selection unit 3717 executes the first selection process (S4005). In the first selection process, the packets used to reproduce the lost session object 201 are selected from the period object 301.

Figure 41:
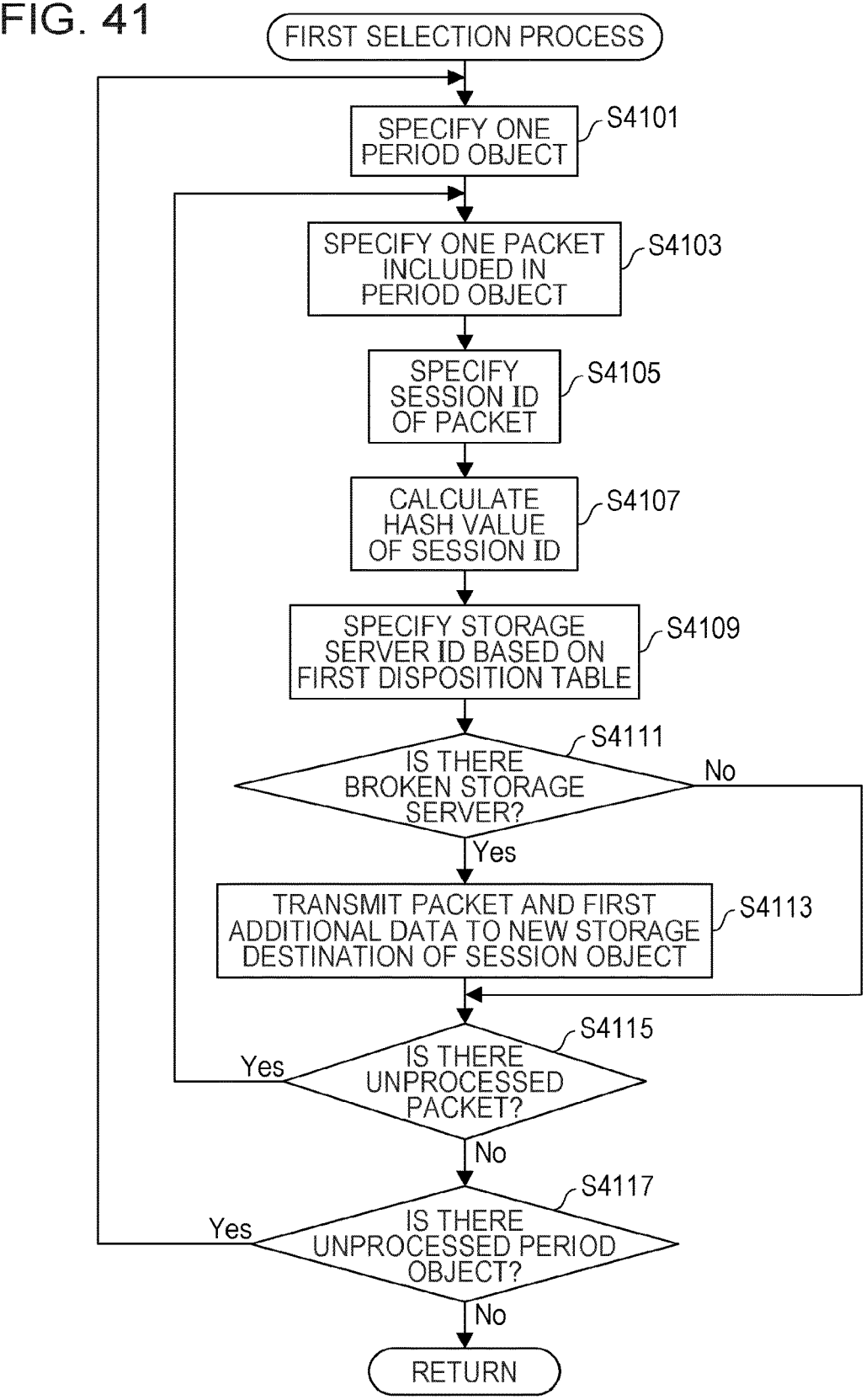
FIG. 41 is a diagram illustrating the flow of a first selection process.

FIG. 41 illustrates the flow of the first selection process. The selection unit 3717 specifies one period object 301 stored in the period object storage unit 3711 (S4101).

The selection unit 3717 specifies one packet included in the period object 301 (S4103). The selection unit 3717 specifies the session ID of the packet (S4105). The selection unit 3717 calculates the hash value of the session ID (S4107). The selection unit 3717 specifies the storage server ID corresponding to the hash value of the session ID based on the first disposition table (S4109).

The selection unit 3717 determines whether the specified storage server ID is the ID of the broken storage server 105 (S4111). In a case in which the selection unit 3717 determines that the specified storage server ID is the ID of the broken storage server 105, the selection unit 3717 transmits the packet and first additional data to the storage server 105 which is a new storage destination via the transmission unit 3701 (S4113). The first additional data includes a packet ID, a session ID, and an acquisition time. In a case in which it is determined that the specified storage server ID is not the ID of the broken storage server 105, the process moves to S4115 without change.

The selection unit 3717 determines whether there is an unprocessed packet (S4115). In a case in which it is determined that there is the unprocessed packet, the process returns to S4103 to repeat the above-described processes.

Conversely, in a case in which it is determined that there is no unprocessed packet, the selection unit 3717 determines whether there is an unprocessed period object 301 (S4117). In a case in which it is determined that there is the unprocessed period object 301, the process returns to S4101 to repeat the above-described processes.

Conversely, in a case in which it is determined that there is no unprocessed period object 301, the first selection process ends and returns to the recovery process of the calling source.

The description will be made referring back to FIG. 40. Next, the selection unit 3717 executes the second selection process (S4007). In the second selection process, the packets to be used to reproduce the lost period object 301 are selected from the session object 201.

Figure 42:
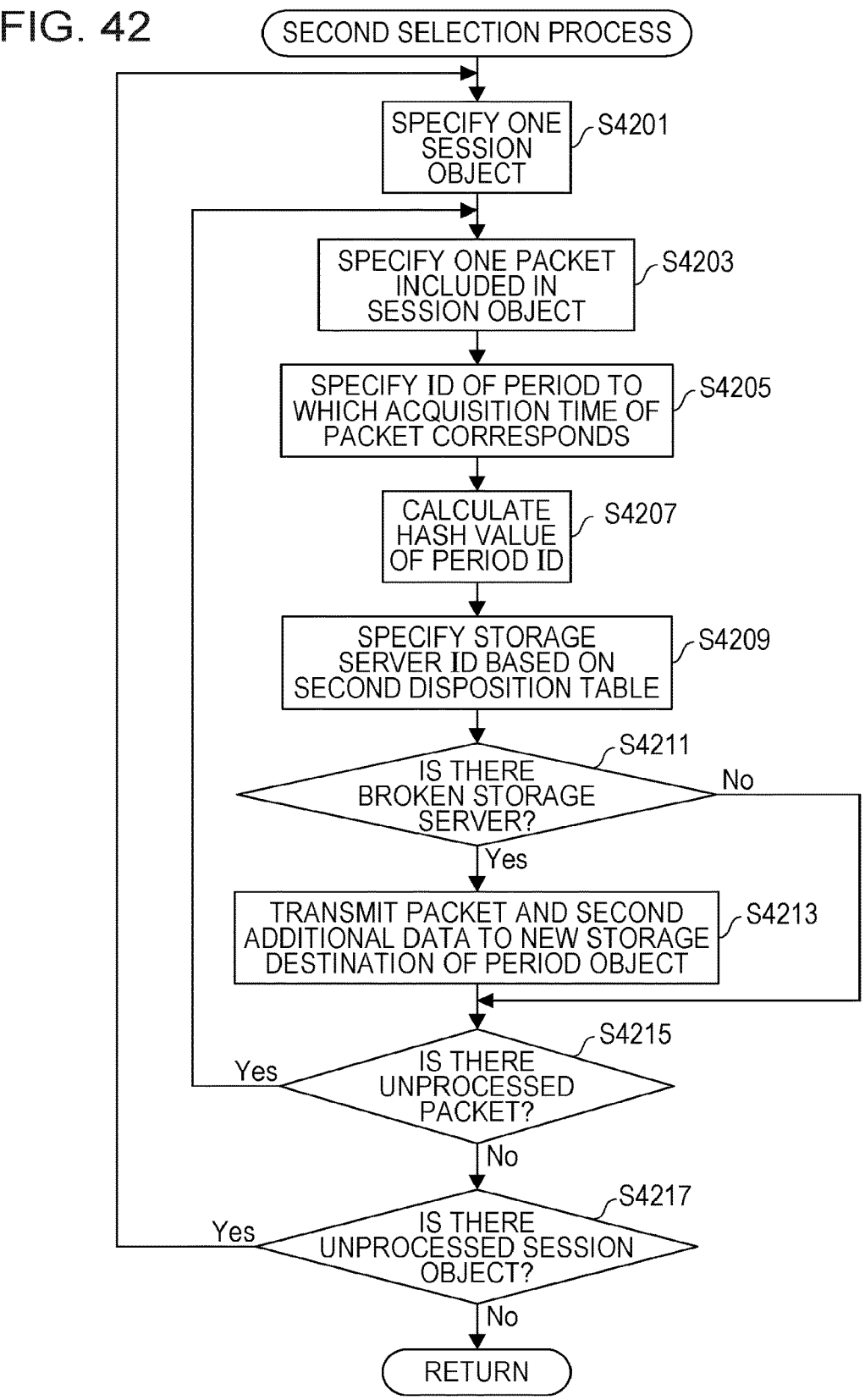
FIG. 42 is a diagram illustrating the flow of a second selection process.

FIG. 42 illustrates the flow of the second selection process. The selection unit 3717 specifies one session object 201 stored in the session object storage unit 3709 (S4201).

The selection unit 3717 specifies one packet included in the session object 201 (S4203). The selection unit 3717 specifies the ID of the period to which the acquisition time of the packet corresponds (S4205). The selection unit 3717 calculates the hash value of the period ID (S4207). The selection unit 3717 specifies the storage server ID based on the second disposition table (S4209). At this time, the selection unit 3717 specifies the ID of the storage server 105 belonging to a different aggregation from the self-storage server 105.

The selection unit 3717 determines whether the specified storage server ID is the ID of the broken storage server 105 (S4211). In a case in which the selection unit 3717 determines that the specified storage server ID is the ID of the broken storage server 105, the selection unit 3717 transmits the packet and second additional data to the storage server 105 which is a new storage destination via the transmission unit 3701 (S4213). The second additional data includes a packet ID, a session ID, an acquisition time, and a period ID. In a case in which it is determined that the specified storage server ID is not the ID of the broken storage server 105, the process moves to S4215 without change.

The selection unit 3717 determines whether there is an unprocessed packet (S4215). In a case in which it is determined that there is the unprocessed packet, the process returns to S4203 to repeat the above-described processes.

Conversely, in a case in which it is determined that there is no unprocessed packet, the selection unit 3717 determines whether there is an unprocessed session object 201 (S4217). In a case in which it is determined that there is the unprocessed session object 201, the process returns to S4201 to repeat the above-described processes.

Conversely, in a case in which it is determined that there is no unprocessed session object 201, the second selection process ends and returns to the recovery process of the calling source.

The description will be made with reference to FIG. 40. When the second selection process ends, the process returns to S4001 to repeat the above-described processes.

Figure 43:
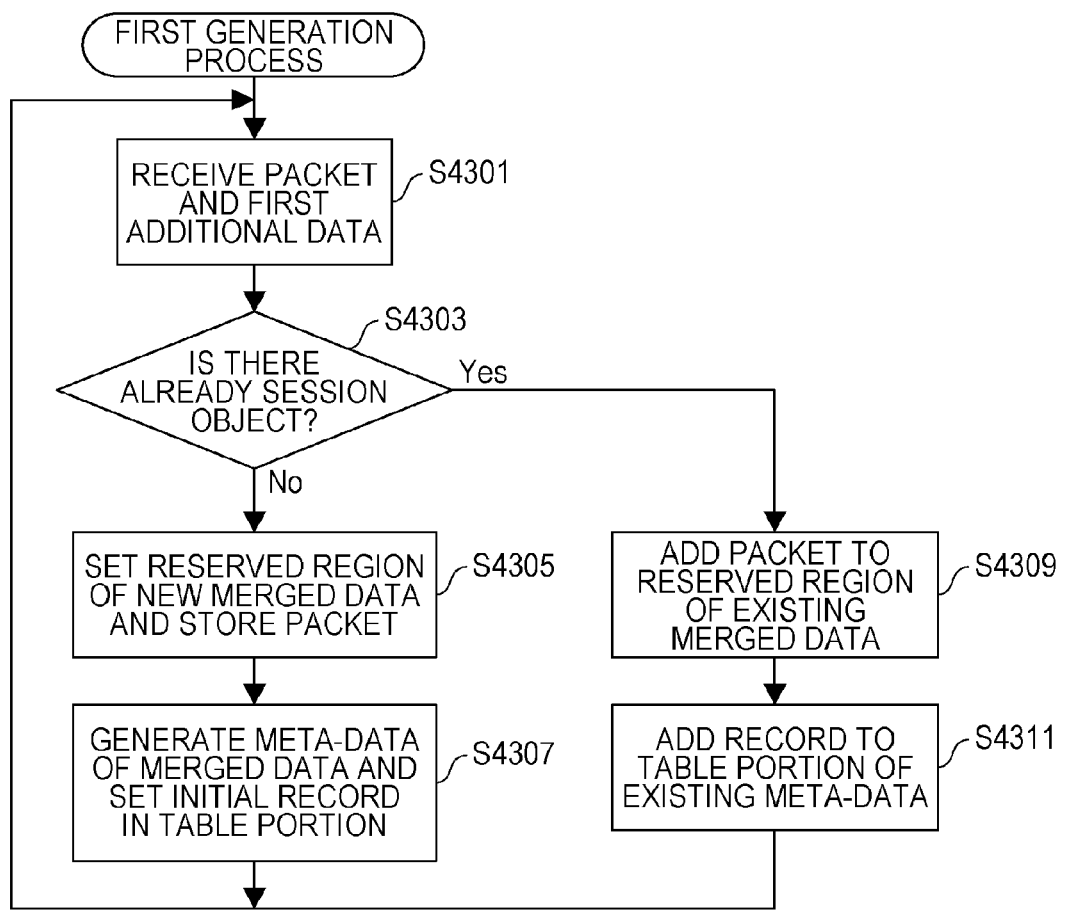
FIG. 43 is a diagram illustrating the flow of a first generation process.

A process by a side reproducing one object will be described. FIG. 43 illustrates the flow of the first generation process. When the reception unit 3703 receives the packet and the first additional data (S4301), the first generation unit 3719 determines whether the session object 201 of the session ID included in the first additional data has already been provided in the session object storage unit 3709 (S4303).

In a case in which the first generation unit 3719 determines that the session object 201 of the session ID has not yet been provided in the session object storage unit 3709, the first generation unit 3719 first sets a reserved region of the new merged data 1603 in the session object storage unit 3709 and stores the packet in the head of the region (S4305). Subsequently, the first generation unit 3719 generates the meta-data 1601 in which the merged data 1603 corresponds to the session object storage unit 3709. In the header portion of the meta-data 1601, the session ID and session data corresponding to the session ID are set. The first generation unit 3719 sets an initial record in the table portion of the meta-data 1601 (S4307). In the record, the packet ID, the offset indicating the head of the packet, and the acquisition date are set.

Conversely, in a case in which the first generation unit 3719 determines that the session object storage unit 3709 related to the session ID has already been provided, the first generation unit 3719 adds a packet to a reserved region of the existing merged data 1603 (S4309). The first generation unit 3719 adds a record to the table portion of the existing meta-data 1601 (S4311). In the record, the packet ID, the offset indicating the head of the packet, and the acquisition date are set. Then, the process returns to S4301 to repeat the above-described processes.

Figure 44:
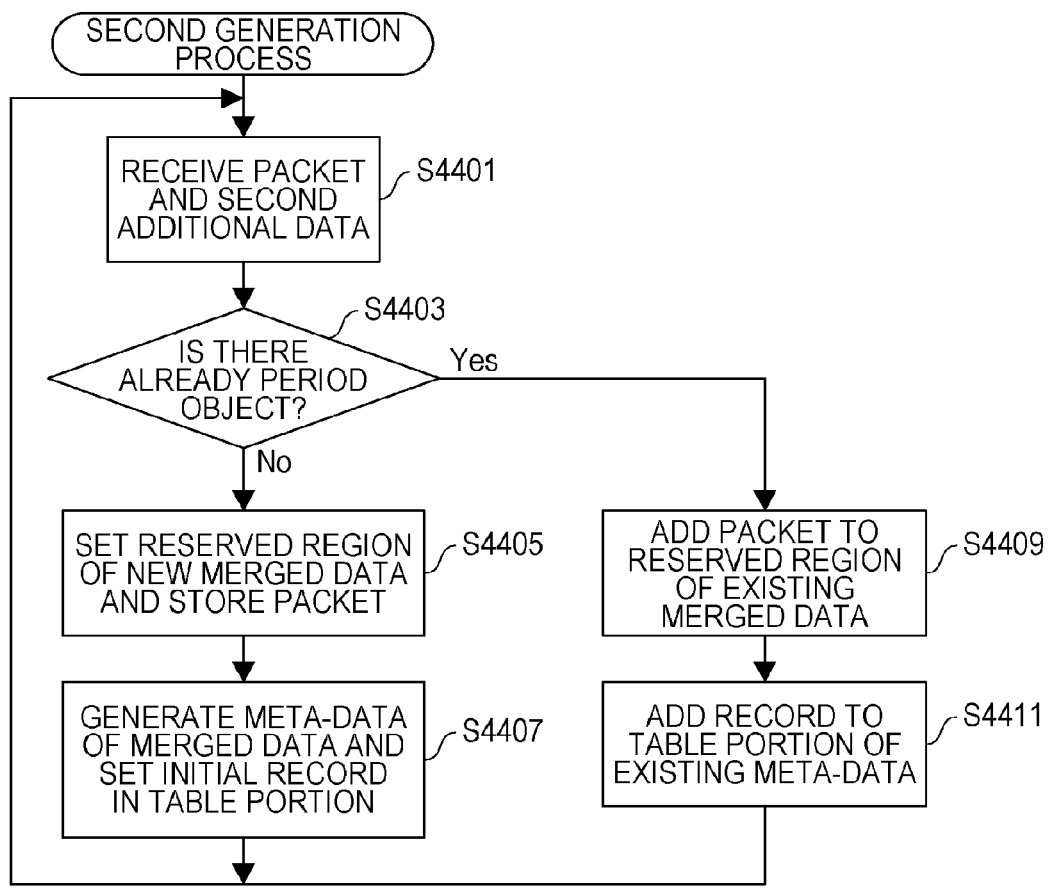
FIG. 44 is a diagram illustrating the flow of a second generation process.

FIG. 44 illustrates the flow of the second generation process. When the reception unit 3703 receives the packet and the second additional data (S4401), the first generation unit 3719 determines whether the period object 301 with the period ID included in the second additional data has already been provided in the period object storage unit 3711 (S4403).

In a case in which the first generation unit 3719 determines that the period object 301 with the period ID has not yet been provided in the period object storage unit 3711, the first generation unit 3719 first sets a reserved region of the new merged data 2003 in the period object storage unit 3711 and stores the packet in the head of the region (S4405). Subsequently, the first generation unit 3719 generates the meta-data 2001 in which the merged data 2003 corresponds to the period object storage unit 3711. In the header portion of the meta-data 2001, the period ID and acquisition start and end dates corresponding to the period ID are set. The first generation unit 3719 sets an initial record in the table portion of the meta-data 2001 (S4407). In the record, the packet ID, the offset indicating the head of the packet, the acquisition date, and the session ID are set.

In a case in which the first generation unit 3719 determines that the period object storage unit 3711 related to the period ID has already been provided, the first generation unit 3719 adds a packet to a reserved region of the existing merged data 2003 (S4409). The first generation unit 3719 adds a record to the table portion of the existing meta-data 2001 (S4411). In the record, the packet ID, the offset indicating the head of the packet, the acquisition date, and the session ID are set. Then, the process returns to S4401 to repeat the above-described processes.

According to the embodiment, it is possible to allow each of the captured packets to be redundant in an easily extracted format.

Further, it is possible to store each of the captured packets in different storage locations.

Further, it is easy to acquire the session object. It can be said to also acquire two or more period objects relatively easy.

Second Embodiment

In the above-described embodiment, the example of a fork type in which the session object 201 and the period object 301 in the capture server 101 are distributed has been described. In the present embodiment, an example of a chain type in which a packet which is a source of the period object 301 in the storage server 105 receiving the session object 201 is transmitted will be described.

An operation of accumulating the session object 201 is the same as the case (FIG. 2) of the first embodiment.

Figure 45:
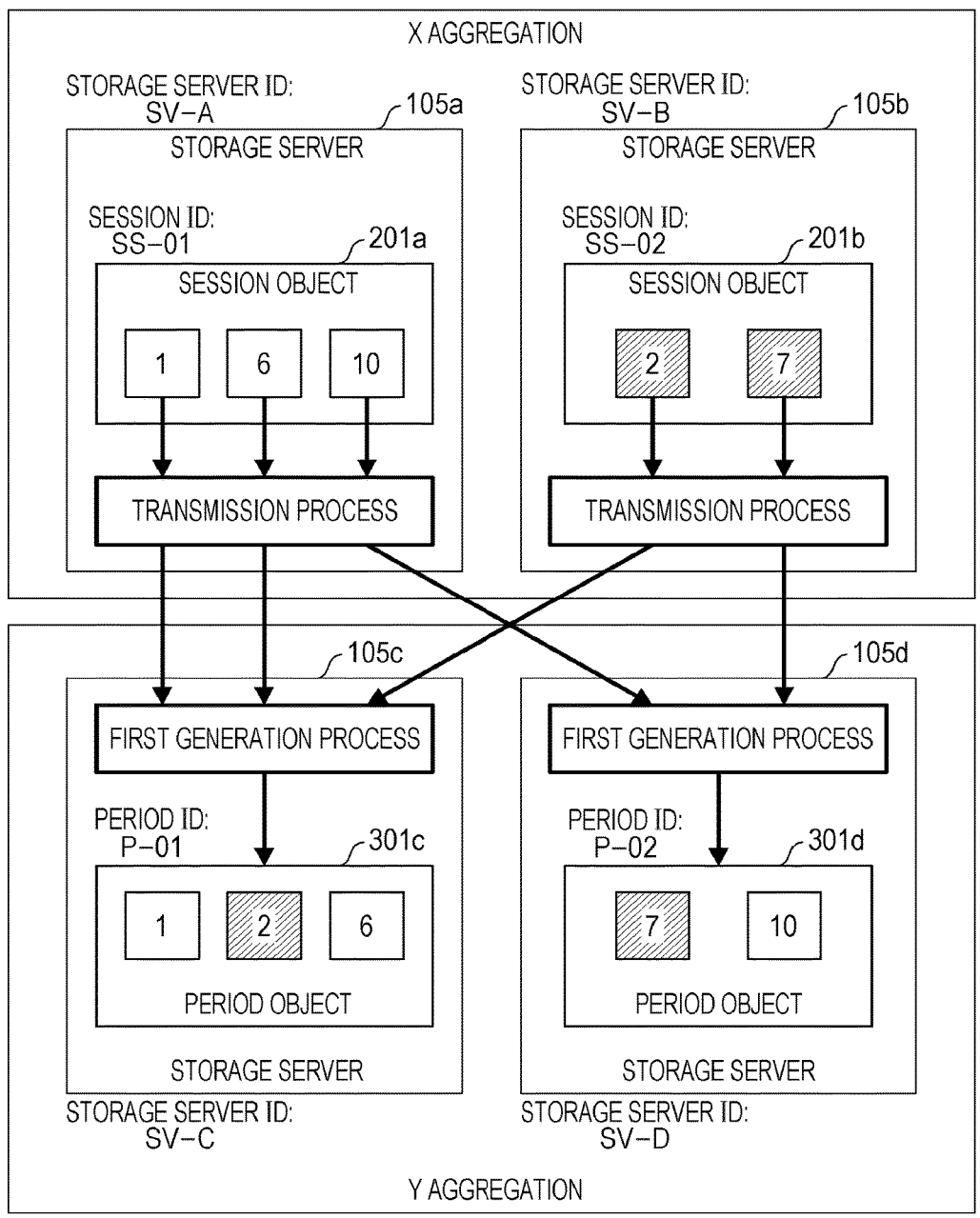
FIG. 45 is a diagram illustrating an overview of an operation of accumulating a period object according to a second embodiment.

FIG. 45 illustrates an overview of an operation of accumulating the period object 301 according to the second embodiment. The storage server 105 belonging to the X aggregation transfers each packet included in the session object 201 maintained by the self-storage server 105 to the storage server 105 belonging to the Y aggregation in the transfer process. The storage server 105 of the transfer destination is uniquely decided based on the ID of the period including the acquisition time of the packet to be transferred.

In this example, the storage server 105a transfers the first and sixth packets included in the session object 201a to the storage server 105c in the transfer process. Further, the storage server 105a similarly transmits the tenth packet included in the session object 201a to the storage server 105d.

The storage server 105b transmits the second packet included in the session object 201b to the storage server 105c in the transfer process. Further, the storage server 105b similarly transmits the seventh packet included in the session object 201b to the storage server 105d.

On the other hand, the storage servers 105 belonging to the Y aggregation generate the period objects 301 in which the received packets are collected.

In this example, when the storage server 105c receives the first, second, and sixth packets, the storage server 105c generates the period object 301c in which these packets are collected in the first generation process.

Further, when the storage server 105d receives the seventh and tenth packets, the storage server 105d generates the period object 301d in which these packets are collected in the first generation process. An operation of the first generation process is the same as recovery in the first embodiment.

Figure 46:
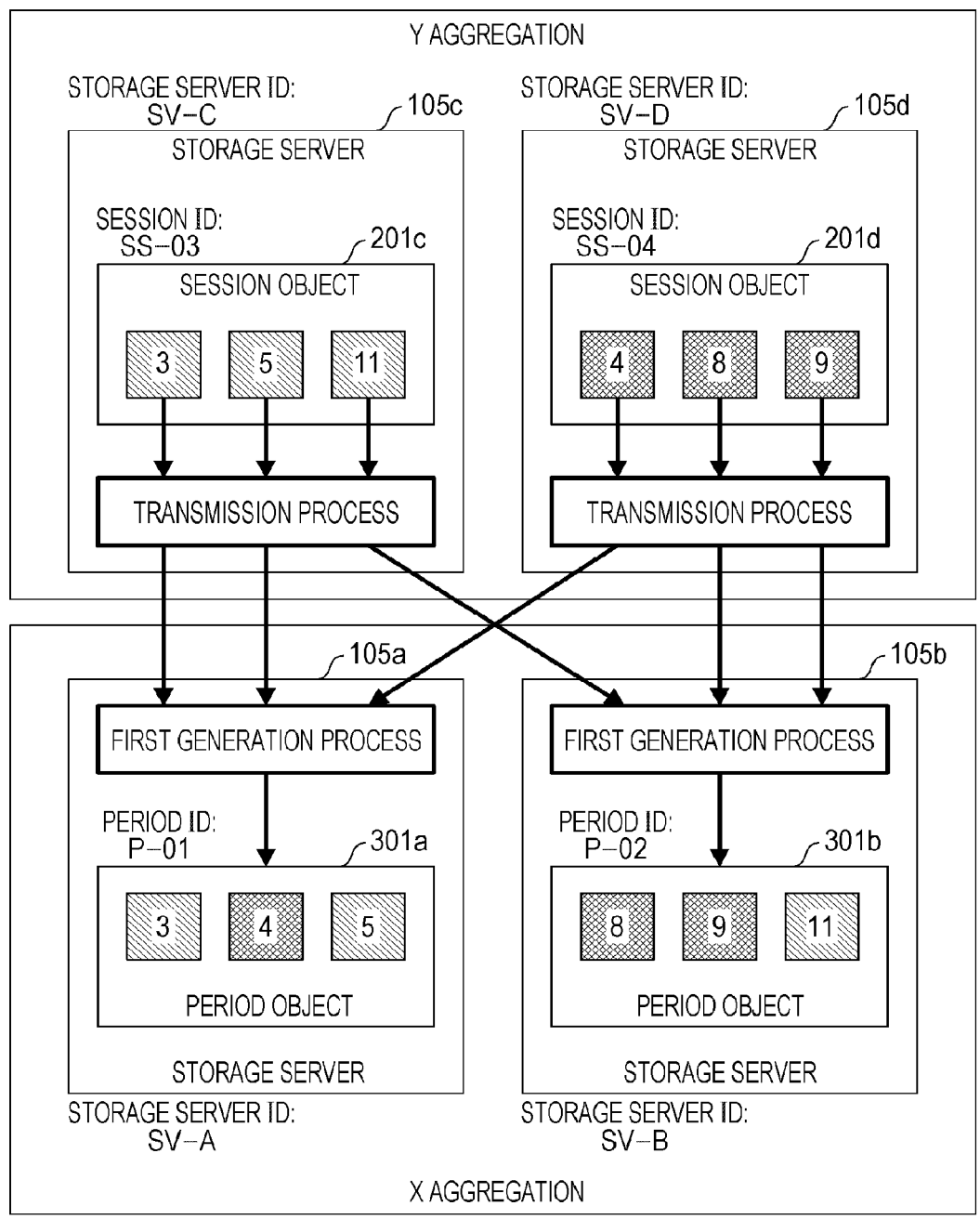
FIG. 46 is a diagram illustrating an overview of an operation of accumulating a period object according to the second embodiment.

FIG. 46 illustrates an overview of an operation of accumulating the period objects 301 according to the second embodiment. The storage servers 105 belonging to the Y aggregation transfers the packets included in the session objects 201 maintained by the self-storage servers 105 to the storage servers 105 belonging to the X aggregation in the transfer process. As described above, the storage server 105 of the transfer destination is uniquely decided based on the ID of the period including the acquisition time of the packet to be transmitted.

In this example, the storage server 105c transmits the third and fifth packets included in the session object 201c to the storage server 105a in the transfer process. Further, the storage server 105c similarly transmits the eleventh packet included in the session object 201c to the storage server 105b.

The storage server 105d transmits the fourth packet included in the session object 201d to the storage server 105a in the transfer process. Further, the storage server 105d similarly transmits the eighth and ninth packets included in the session object 201d to the storage server 105b.

On the other hand, the storage servers 105 belonging to the X aggregation generate the period objects 301 in which the received packets are collected.

In this example, when the storage server 105a receives the third, fourth, and fifth packets, the storage server 105a generates the period object 301a in which these packets are collected in the first generation process.

Further, when the storage server 105b receives the eighth, ninth, and eleventh packets, the storage server 105b generates the period object 301b in which these packets are collected in the first generation process. The overview of the embodiment has been described above.

Figure 47:
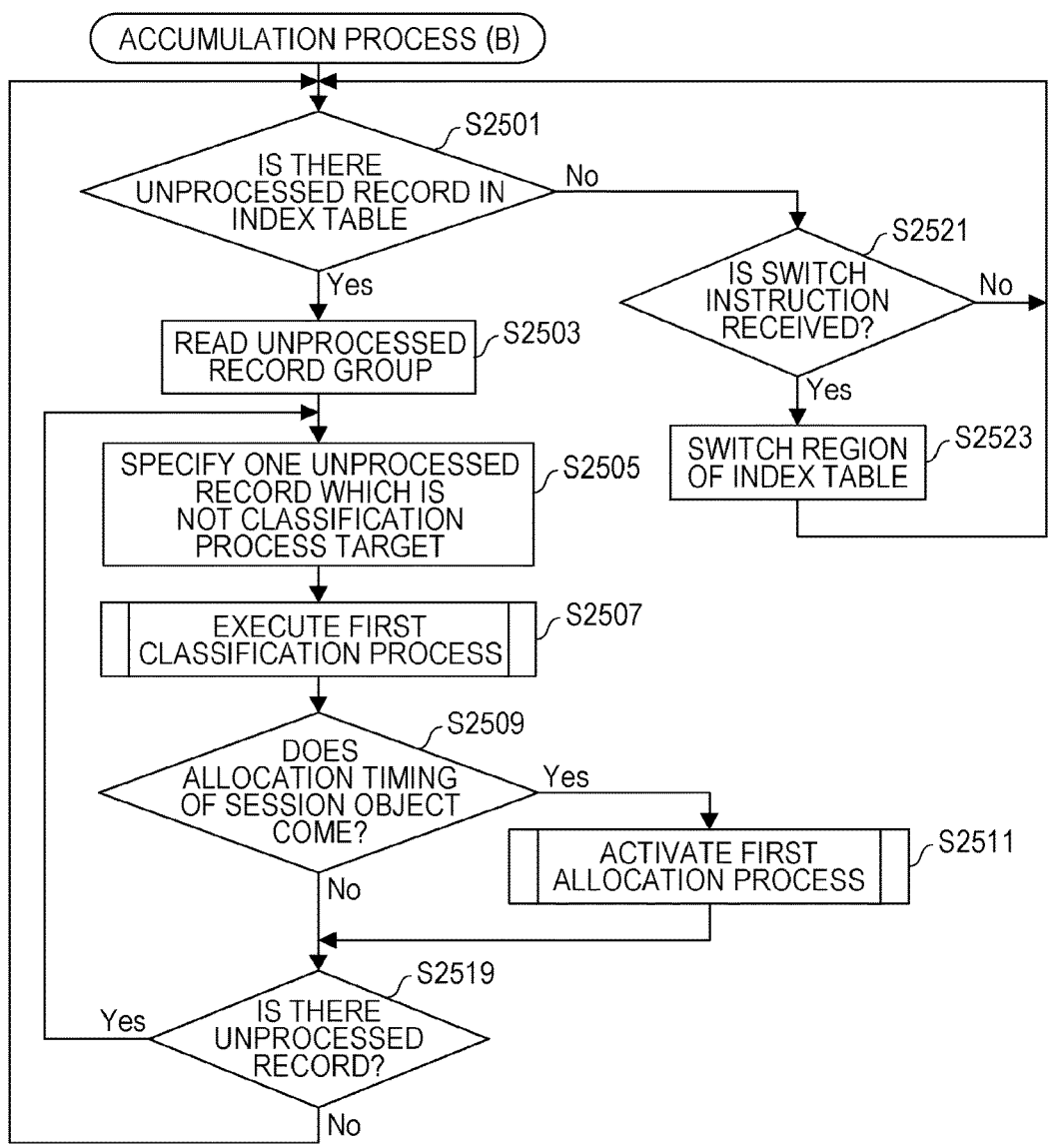
FIG. 47 is a diagram illustrating the flow of an accumulation process (B)

In the capture server 101, an accumulation process (B) is executed instead of the accumulation process (A). FIG. 47 illustrates the flow of the accumulation process (B). Of the processes illustrated in FIG. 25, the processes of S2513 to S2517 are omitted.

Figure 48:
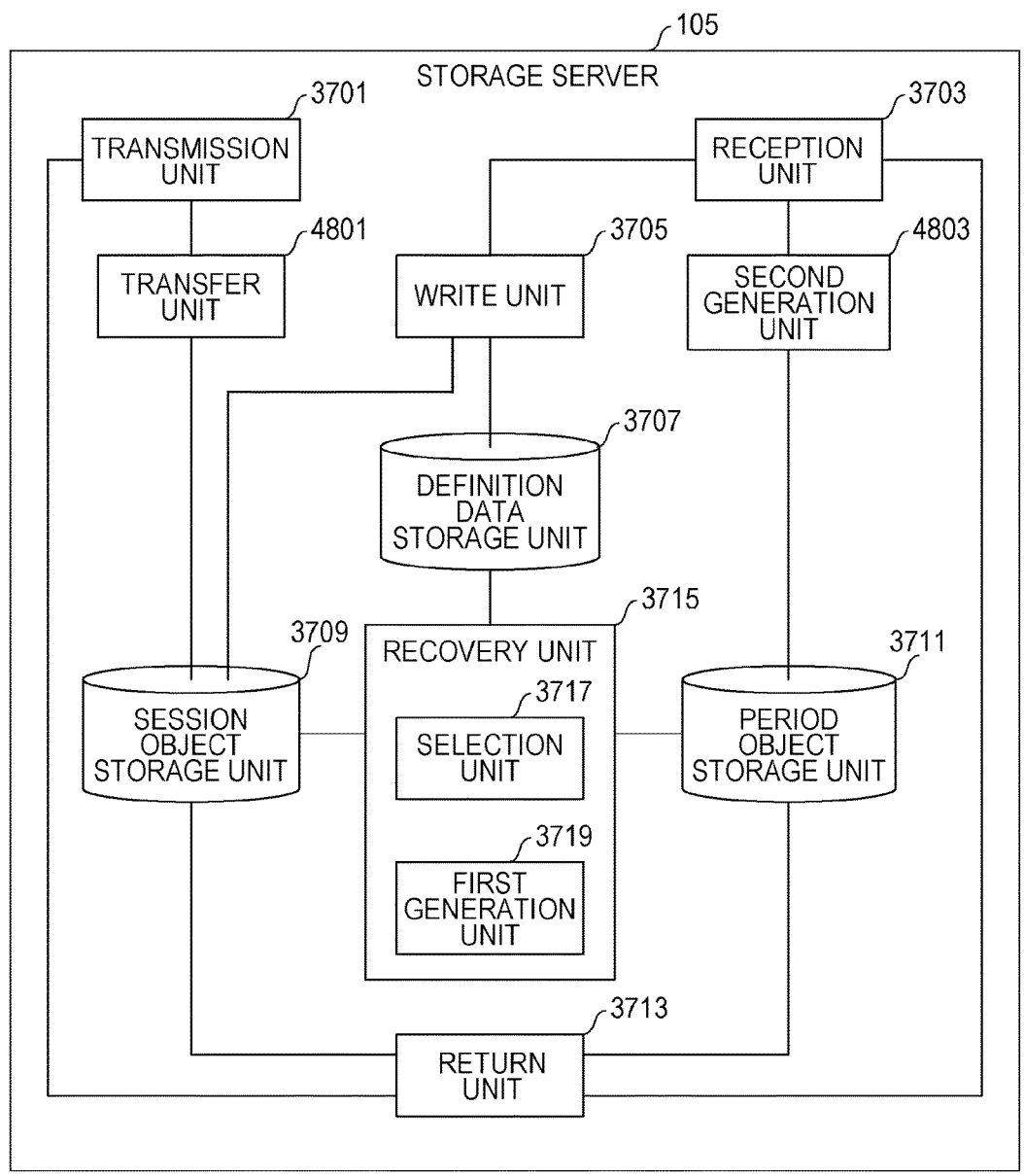
FIG. 48 is a diagram illustrating a module configuration example of a storage server according to the second embodiment.

Next, an operation of the storage server 105 will be described. FIG. 48 illustrates a module configuration example of the storage server 105 according to the second embodiment. The storage server 105 according to the second embodiment includes a transfer unit 4801 and a second generation unit 4803 in addition to the modules illustrated in FIG. 37.

The transfer unit 4801 executes a transfer process. The second generation unit 4803 similarly executes the first generation process as the first generation unit 3719.

The transfer unit 4801 and the second generation unit 4803 described above are realized using hardware resources (for example, see FIG. 51) and a program causing a processor to execute processes to be described below.

Figure 49:
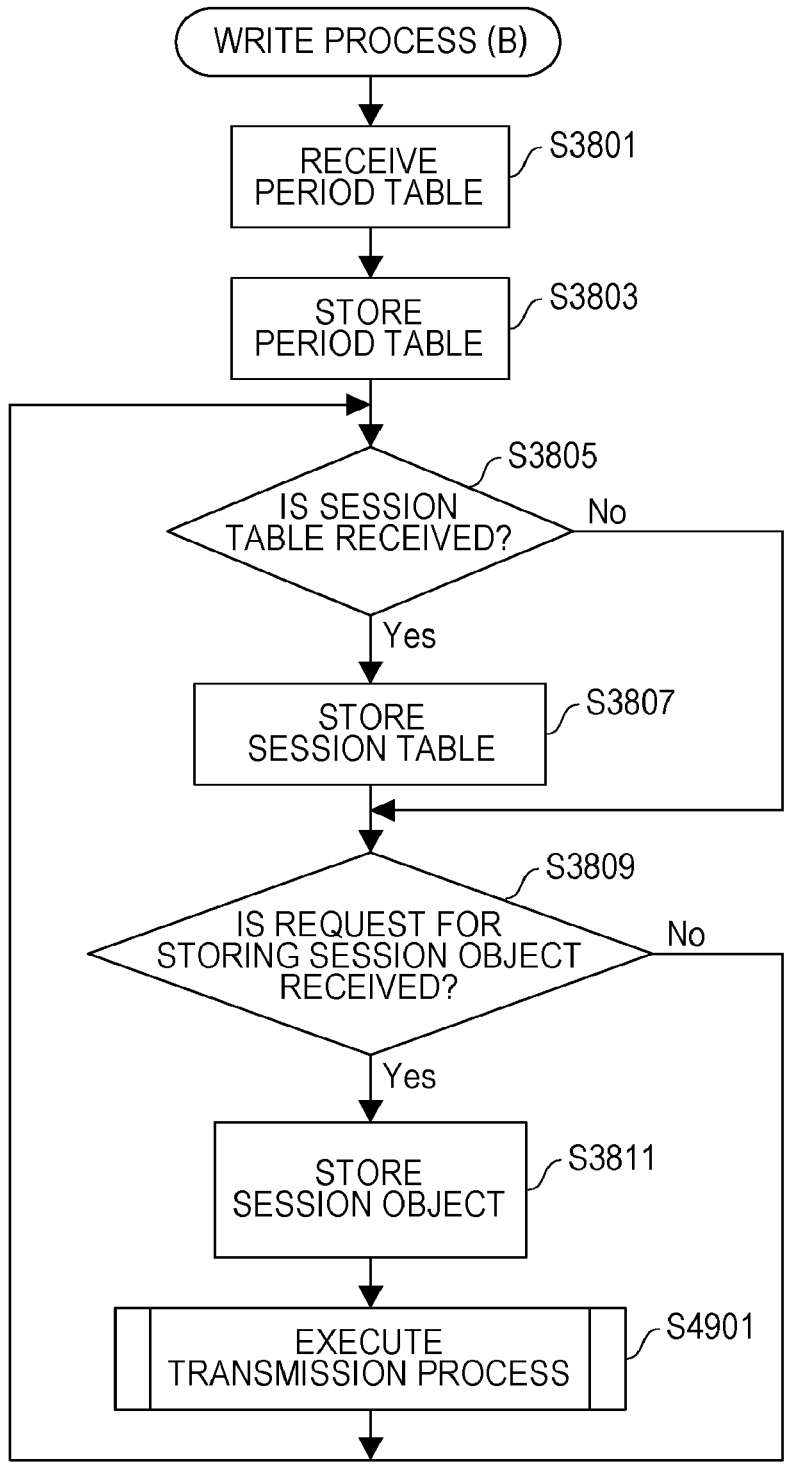
FIG. 49 is a diagram illustrating the flow of a write process (B)

In the embodiment, a write process (B) is executed instead of the write process (A). FIG. 49 illustrates the flow of the write process (B). Processes of S3801 to S3811 are the same as those of the case of FIG. 38. Subsequently to the process of S3811, the transfer unit 4801 executes the transfer process (S4901).

Figure 50:
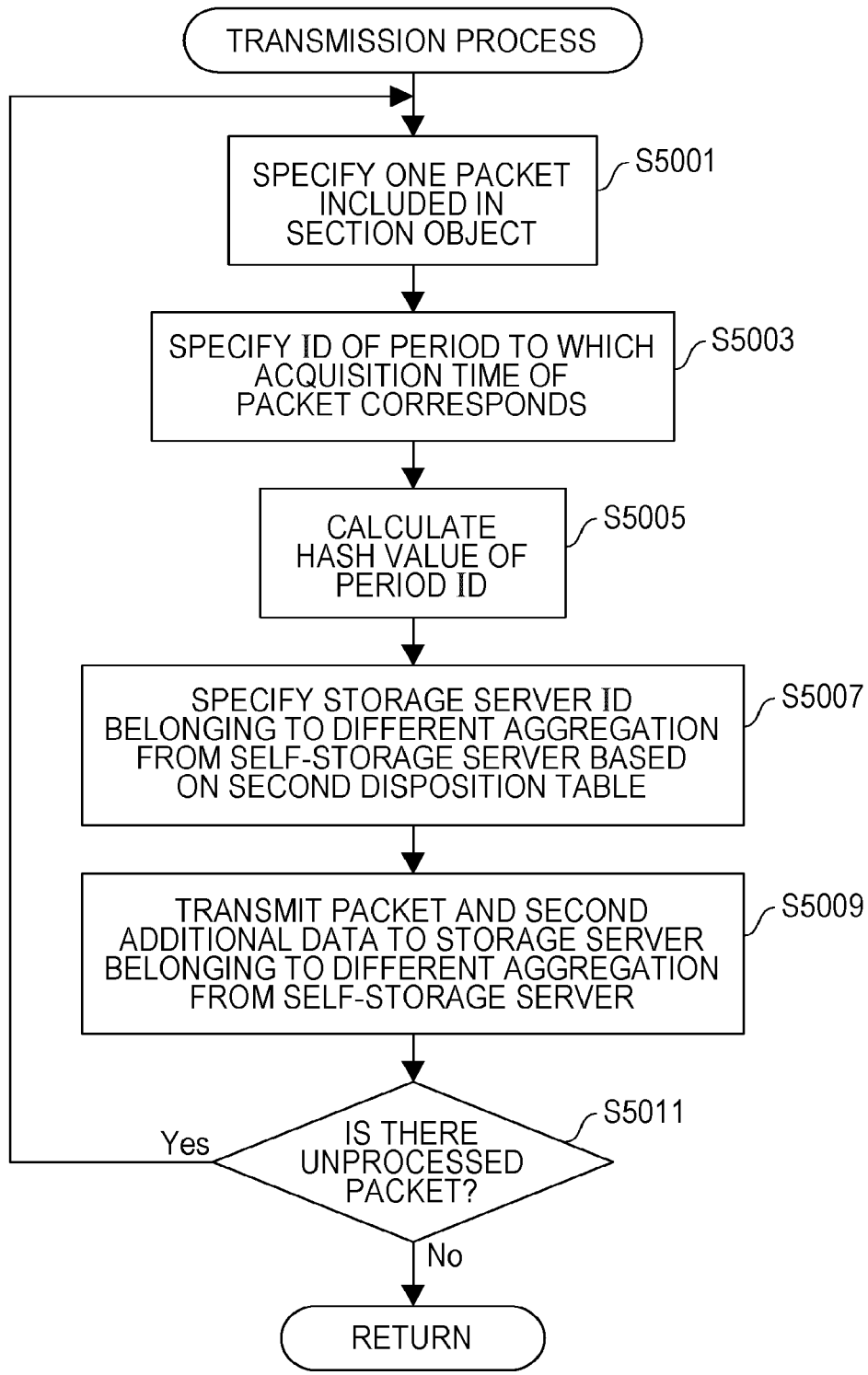
FIG. 50 is a diagram illustrating the flow of a transfer process.

FIG. 50 illustrates the flow of the transfer process. The transfer unit 4801 specifies one packet included in the session object 201 stored in S3811 (S5001).

The transfer unit 4801 specifies the ID of the period to which the acquisition time of the packet corresponds (S5003). The transfer unit 4801 calculates the hash value of the specified period ID (S5005). The transfer unit 4801 specifies the storage server ID belonging to a different aggregation from the self-storage server 105 based on the second disposition table (S5007). The transfer unit 4801 transmits the packet and the second additional data to the specified storage server 105 via the transmission unit 3701 (S5009).

The transfer unit 4801 determines whether there is an unprocessed packet (S5011). In a case in which it is determined that there is the unprocessed packet, the process returns to S5001 to repeat the above-described processes. Conversely, in a case in which it is determined that there is no unprocessed packet, the transfer process ends and returns to the write process (B) of the calling source.

The description will be made referring back to FIG. 49. In a case in which it is determined in S3809 that the request for storing the session object 201 is not received, the process returns to S3805 to repeat the above-described processes. In a case in which the transfer process ends, the process returns to S3805 to repeat the above-described processes.

The second generation unit 4803 executes the first generation process. The first generation process in the second generation unit 4803 is the same as that of the case according to the first embodiment (FIG. 43).

According to the embodiment, it is possible to distribute traffic.

The embodiment has been described above, but embodiments are not limited thereto. For example, the above-described functional block configuration does not agree with a program module configuration in some cases.

The configuration of each storage region described above is an example and may not be the above-described configuration. Further, even in the flow of the process, the procedure of the processes may be changed or the plurality of processes may be executed in parallel as long as the process result is not changed.

The above-described capture server 101 is a computer apparatus. As illustrated in FIG. 51, a memory 2501, a CPU 2503, a hard disk drive (HDD) 2505, a display control unit 2507 coupled to a display device 2509, a drive device 2513 for a removable disc 2511, an input device 2515, a communication control unit 2517a coupled to a monitoring target network, and a communication control unit 2517b coupled to a transmission network are coupled by a bus 2519 in some cases. Depending on a case, the display control unit 2507, the display device 2509, the drive device 2513, and the input device 2515 are not included in some cases. An operating system (OS) and an application program executing the processes according to the embodiments are stored in the HDD 2505 and is read from the HDD 2505 to the memory 2501 when the program is executed by the CPU 2503. Depending on necessity, the CPU 2503 controls the display control unit 2507, the communication control unit 2517a, the communication control unit 2517b, and the drive device 2513 to execute indispensable operations. Data which is being processed is stored in the HDD 2505 when the data is indispensably stored in the memory 2501. In the embodiments, the application program executing the above-described processes is stored and distributed in the computer-readable removable disc 2511 and is installed from the drive device 2513 to the HDD 2505. The application program is installed to the HDD 2505 via the monitoring target network and the communication control unit 2517a or via the transmission network and the communication control unit 2517b. The computer apparatus realizes the above-described various functions by organically cooperating the hardware such as the CPU 2503 and the memory 2501 described above, the OS, and an indispensable application program.

The above-described storage server 105 is also a computer apparatus and has the configuration illustrated in FIG. 51 in some cases. However, the storage server 105 does not include the communication control unit 2517a coupled to the monitoring target network in some cases.

The embodiments described above will be summarized below.

A packet control method according to the embodiment includes (A) processes of allocating a plurality of first groups in which a plurality of packets captured from a network are classified in accordance with a first scheme to a plurality of storage locations; and (B) allocating a plurality of second groups in which the plurality of packets are classified in accordance with a second scheme to the plurality of storage locations.

In this way, it is possible to allow each of the captured packets to be redundant in an easily extracted format.

Further, when the plurality of packets are classified in the plurality of second groups in accordance with the second scheme, the second groups allocated to the storage locations other than the storage locations allocated to the first groups to which the packets belong may be selected.

In this way, it is possible to store each of the captured packets in different storage locations.

In the first scheme, the first group may be provided for each session. In the second scheme, two or more of the second groups may be provided for each capture period. The second groups related to a common capture period may be allocated to different storage locations.

In this way, it is easy to acquire the first groups. It can be said to be also relatively easy to acquire two or more second groups.

The packet control method according to the embodiment, a packet control method includes processes of: (C) receiving a packet group of first groups in which a plurality of packets captured from a network are classified in accordance with a first scheme; and (D) transmitting the plurality of packets included in the first groups to destinations allocated to second groups in which the packets are classified in accordance with a second scheme.

In this way, it is possible to distribute traffic.

A program causing a computer to execute the processes according to the foregoing method can be generated. The program may be stored in, for example, a computer-readable storage medium included in a storage that includes a flexible disc, a compact disk read only memory (CD-ROM), a digital versatile disc (DVD), a magneto-optical disc, a semiconductor memory, or a hard disk drive. An intermediate processing result is temporarily stored in a storage such as a general main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process, the process comprising:
receiving a plurality of packets captured from a network and allocating a plurality of first groups in which the plurality of packets are classified in accordance with a first scheme to a plurality of storage locations in a storage;
allocating a plurality of second groups in which the plurality of packets are classified in accordance with a second scheme to the plurality of storage locations in the storage; and
selecting the second groups allocated to the storage as storage locations other than the storage locations to which the first groups to which the packets belong are allocated when the plurality of packets are classified in the plurality of second groups in accordance with the second scheme, wherein
in the first scheme, the plurality of first groups are allocated according to whether a first period object identified by a period identifier has been provided, and
in the second scheme, the plurality of second groups are allocated according to whether a second period object identified by another period identifier has been provided.

2. The non-transitory, computer-readable recording medium according to claim 1, wherein
in the first scheme, a first group of the plurality of first groups is provided for each session, and
in the second scheme, two or more of the second groups are provided for each capture period and the second groups related to a common capture period are allocated as mutually different storage locations in the storage.

3. A packet control apparatus, comprising:
a memory; and
a processor coupled to the memory, and the processor configured to:

receive a plurality of packets captured from a network and allocate a plurality of first groups in which the packets are classified in accordance with a first scheme to a plurality of storage locations in a storage, and allocate a plurality of second groups in which the plurality of packets are classified in accordance with a second scheme to the plurality of storage locations in the storage; and select the second groups allocated to the storage as locations other than the locations to which the first groups to which the packets belong are allocated when the plurality of packets are classified in the plurality of second groups in accordance with the second scheme, wherein in the first scheme, the plurality of first groups are allocated according to whether a first period object identified by a period identifier has been provided, and in the second scheme, the plurality of second groups are allocated according to whether a second period object identified by another period identifier has been provided.

4. The packet control apparatus according to claim 3, wherein in the first scheme, a first group of the plurality of first groups is provided for each session, and in the second scheme, two or more of the second groups are provided for each capture period and the second groups related to a common capture period are allocated as mutually different locations in the storage.

5. A packet control system, comprising:

a capture server; and a plurality of storage servers, wherein the capture server is configured to:

allocate a plurality of first groups in which a plurality of packets captured from a network are classified in accordance with a first scheme to a plurality of storage locations in the plurality of storage servers, and allocate a plurality of second groups in which the plurality of packets are classified in accordance with a second scheme to the plurality of storage locations in the plurality of storage servers, in the first scheme, the plurality of first groups are allocated according to whether a first period object identified by a period identifier has been provided, and in the second scheme, the plurality of second groups are allocated according whether a second period object identified by another period identifier has been provided.

6. The packet control system according to claim 5, wherein in the first scheme, a first group of the plurality of first groups is provided for each session, and in the second scheme, two or more of the second groups are provided for each capture period and the second groups related to a common capture period are allocated as mutually different locations in the plurality of storage servers.

7. The packet control system according to claim 5, wherein each of the plurality of storage servers is configured to:

select a same packet as a packet of a first group of the plurality of first groups allocated to a certain storage location other than a storage location of a storage server among packets of the second group allocated to the storage location of the storage server, and transmit the selected same packet to a new storage server destination of the first group allocated to the certain storage location.

8. A packet control system, comprising:

a capture server; and a plurality of storage servers, wherein the capture server is configured to allocate a plurality of first groups in which a plurality of packets captured from a network are classified in accordance with a first scheme to a plurality of storage locations in the capture server, and each of the plurality of storage servers is configured to:

correspond to one of the plurality of storage locations, receive the allocated first group, and transmit the plurality of packets included in the first groups to the plurality of storage servers corresponding to storage locations allocated to second groups classified in accordance with a second scheme, in the first scheme, the plurality of first groups are allocated according to whether a first period object identified by a period identifier has been provided, and in the second scheme, the plurality of second groups are allocated according to whether a second period object identified by another period identifier has been provided.

9. The packet control system according to claim 8, wherein each of the plurality of storage servers is configured to:

select the same packet as a packet of the first group allocated to a certain storage location other than the storage location of a storage server among packets of a second group allocated to the storage location of the storage server, and transmit the selected packet to a new storage server destination of the first group allocated to the certain storage location.

10. The packet control system according to claim 8, wherein each of the plurality of storage servers configured to:

select the same packet as a packet of a second group allocated to a certain storage location other than the storage location of the storage server among packets of the first group allocated to the storage location of the storage server, and transmit the selected packet to a new storage server destination of the second group allocated to the certain storage location.

* * * * *